US010020512B2

(12) United States Patent
Gronwald et al.

(10) Patent No.: US 10,020,512 B2
(45) Date of Patent: Jul. 10, 2018

(54) POLYMER FOR USE AS PROTECTIVE LAYERS AND OTHER COMPONENTS IN ELECTROCHEMICAL CELLS

(71) Applicants: Sion Power Corporation, Tucson, AZ (US); BASF SE, Ludwigshafen (DE)

(72) Inventors: Oliver Gronwald, Heusenstamm (DE); Igor P. Kovalev, Vail, AZ (US); Ashley H. Bulldis, Sahuarita, AZ (US); Yuriy V. Mikhaylik, Tucson, AZ (US)

(73) Assignees: Sion Power Corporation, Tucson, AZ (US); BASF SE, Ludwigshafen (DE)

( * ) Notice: Subject to any disclaimer, the term of this patent is extended or adjusted under 35 U.S.C. 154(b) by 465 days.

(21) Appl. No.: 14/576,570

(22) Filed: Dec. 19, 2014

(65) Prior Publication Data
US 2015/0180037 A1  Jun. 25, 2015

Related U.S. Application Data

(60) Provisional application No. 61/918,590, filed on Dec. 19, 2013.

(51) Int. Cl.
*H01M 4/02* (2006.01)
*H01M 4/62* (2006.01)
*H01M 4/136* (2010.01)
*H01M 10/0525* (2010.01)
*H01M 10/0565* (2010.01)
*C08F 12/20* (2006.01)
*C08F 12/22* (2006.01)
*C08F 12/26* (2006.01)
*C08F 12/30* (2006.01)

(Continued)

(52) U.S. Cl.
CPC ............. *H01M 4/62* (2013.01); *C08F 12/20* (2013.01); *C08F 12/22* (2013.01); *C08F 12/26* (2013.01); *C08F 12/30* (2013.01); *C09D 125/18* (2013.01); *H01M 4/136* (2013.01); *H01M 10/0525* (2013.01); *H01M 10/0565* (2013.01); *H01M 4/366* (2013.01); *H01M 2300/0082* (2013.01)

(58) Field of Classification Search
CPC .... H01M 10/0525; H01M 4/62; H01M 4/136; H01M 10/0565; H01M 4/366; H01M 2300/0082; C08F 12/30; C08F 12/26; C08F 12/20; C08F 12/22; C08F 212/14; C08F 212/36; C09D 125/18
USPC ........................................................ 429/209
See application file for complete search history.

(56) References Cited

U.S. PATENT DOCUMENTS 5,874,616 A     2/1999  Howells et al.
6,565,763 B1 *  5/2003  Asakawa ............... B82Y 10/00
                                                 216/22

(Continued)

FOREIGN PATENT DOCUMENTS

WO     WO 99/67304 A1    12/1999

OTHER PUBLICATIONS

International Search Report and Written Opinion for PCT/EP2014/003440 dated Apr. 16, 2015.

(Continued)

*Primary Examiner* — Gary Harris
(74) *Attorney, Agent, or Firm* — Wolf, Greenfield & Sacks, P.C.

(57) ABSTRACT

Polymers for use as protective layers and other components in electrochemical cells are provided. In some embodiments, the electrochemical cell is a lithium-based electrochemical cell.

29 Claims, 2 Drawing Sheets

(51) Int. Cl.
*C09D 125/18* (2006.01)
*H01M 4/36* (2006.01)

(56) References Cited

U.S. PATENT DOCUMENTS

| | | | |
|---|---|---|---|
| 7,247,408 B2 | 7/2007 | Skotheim et al. |
| 7,771,870 B2 | 8/2010 | Affinito et al. |
| 7,785,730 B2 | 8/2010 | Affinito et al. |
| 8,076,024 B2 | 12/2011 | Affinito et al. |
| 8,105,717 B2 | 1/2012 | Skotheim et al. |
| 8,197,971 B2 | 6/2012 | Skotheim et al. |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 2002/0012846 A1 | 1/2002 | Skotheim et al. |
| 2004/0236062 A1 | 11/2004 | Hofman |
| 2006/0222954 A1 | 10/2006 | Skotheim et al. |
| 2007/0224502 A1 | 9/2007 | Affinito et al. |
| 2008/0014501 A1 | 1/2008 | Skotheim et al. |
| 2008/0057397 A1 | 3/2008 | Skotheim et al. |
| 2008/0213672 A1 | 9/2008 | Skotheim et al. |
| 2009/0291353 A1 | 11/2009 | Affinito et al. |
| 2010/0129699 A1 | 5/2010 | Mikhaylik et al. |
| 2010/0291442 A1 | 11/2010 | Wang et al. |
| 2010/0327811 A1 | 12/2010 | Affinito et al. |
| 2011/0068001 A1 | 3/2011 | Affinito et al. |
| 2011/0177398 A1 | 7/2011 | Affinito et al. |
| 2012/0043940 A1 | 2/2012 | Affinito et al. |
| 2012/0052397 A1 | 3/2012 | Mikhaylik et al. |
| 2012/0276449 A1 | 11/2012 | Skotheim et al. |
| 2013/0017441 A1 | 1/2013 | Affinito et al. |
| 2013/0095380 A1 | 4/2013 | Affinito et al. |
| 2013/0143096 A1 | 6/2013 | Affinito et al. |
| 2013/0216915 A1 | 8/2013 | Affinito et al. |
| 2013/0280605 A1 | 10/2013 | Affinito et al. |
| 2014/0045075 A1 | 2/2014 | Skotheim et al. |
| 2014/0062411 A1 | 3/2014 | Mikhaylik et al. |
| 2014/0072873 A1 | 3/2014 | Wang et al. |
| 2014/0079994 A1 | 3/2014 | Affinito et al. |
| 2014/0123477 A1 | 5/2014 | Safont-Sempere et al. |
| 2014/0127419 A1 | 5/2014 | Fleischmann et al. |
| 2014/0127577 A1* | 5/2014 | Fleischmann ......... H01M 4/139 429/215 |
| 2014/0205912 A1 | 7/2014 | Skotheim et al. |
| 2014/0272565 A1 | 9/2014 | Gronwald et al. |
| 2014/0272594 A1 | 9/2014 | Safont-Sempere et al. |
| 2014/0272600 A1* | 9/2014 | Bouchet ................ C08J 5/2243 429/305 |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0280277 A1 | 10/2015 | Fleischmann et al. |
| 2015/0287986 A1 | 10/2015 | Affinito et al. |
| 2015/0318552 A1 | 11/2015 | Skotheim et al. |

OTHER PUBLICATIONS

Kamogawa et al., Conversions of Carbonyl Compounds via Their Polymeric Sulfonylhydrazones into Alkenes, Alkanes, and Nitriles. Chem Soc Jpn. 1983;56:762-5.

* cited by examiner

POLYMER FOR USE AS PROTECTIVE LAYERS AND OTHER COMPONENTS IN ELECTROCHEMICAL CELLS

RELATED APPLICATIONS

This application claims priority under 35 U.S.C. § 119(e) to U.S. Provisional Application Ser. No. 61/918,590, entitled "Polymer for Use as Protective Layers and Other Components in Electrochemical Cells," filed Dec. 19, 2013, which is incorporated herein by reference in its entirety for all purposes.

FIELD OF INVENTION

The present invention generally relates to polymers for use as protective layers and/or other components in electrochemical cells. The electrochemical cell can be an alkali metal cell (e.g., a lithium metal or lithium ion cell).

BACKGROUND

Lithium compound-containing electrochemical cells and batteries containing such cells are modern means for storing energy. They exceed conventional secondary batteries with respect to capacity and life-time and, in many times, use of toxic materials such as lead can be avoided. However, in contrast to conventional lead-based secondary batteries, various technical problems have not yet been solved. For example, the reactivity of lithium and the associated cycle life, dendrite formation, electrolyte compatibility, and fabrication and safety problems have hindered the commercialization of lithium cells. Despite the various approaches proposed for forming electrodes and protective layers, improvements are needed.

SUMMARY OF THE INVENTION

The present invention generally relates to polymers for use as protective layers and other components in electrochemical cells. The subject matter of the present invention involves, in some cases, interrelated products, alternative solutions to a particular problem, and/or a plurality of different uses of one or more systems and/or articles.

Polymers, and articles comprising polymers, as described herein are provided. In some cases, the article may be for use in an electrochemical cell. In some cases, the article may be for use as an electrode. In some cases, the article may be for use as a protective structure or protective layer (e.g., in an electrochemical cell). In some embodiments, an article is provided comprising an electroactive layer; and a polymer layer in contact with the electroactive layer and comprising a polymer. In some embodiments, the article may be for use in an electrochemical cell as an electrode.

In some embodiments, the article may be for use in an electrochemical cell, wherein the electrochemical cell comprises an anode comprising the electroactive layer; a protective layer comprising the polymer layer; and a cathode. In some embodiments, the electroactive layer comprises lithium metal or a lithium metal alloy. In some embodiments, electrochemical cells are provided comprising an anode comprising lithium; a protective layer adjacent to the anode comprising a polymer; and a cathode.

In some embodiments, the articles and/or electrochemical cells described herein include a polymer having at least a first type of side chain and a second type of side chain. The first type of side chain includes a group capable of associating with a metal cation. The second type of side chain includes a hydrophilic group.

In certain embodiments described herein, the first type of side chain includes a negatively charged group, e.g., a negatively charged nitrogen or phosphorous atom.

In some cases, the articles and/or electrochemical cells include a polymer comprising a polyvinyl backbone and at least a first type of side chain and a second type of side chain, wherein the first type of side chain is capable of associating with a metal cation and the second type of side chain comprises a hydrophilic group.

In some embodiments, the articles and/or electrochemical cells include a polymer prepared by polymerization of, or comprises polymerized units of, a first monomer comprising a group capable of associating with a metal cation, a second monomer comprising a hydrophilic group, and, optionally, a third monomer comprising a crosslinking group.

In some embodiments, the first monomer has the following structure,

wherein W is a group including a portion that is capable of associating with a metal cation. In some embodiments, W comprises an optionally substituted alkylene, an optionally substituted heteroalkylene, an optionally substituted arylene, or an optionally substituted heteroalkylene. In some embodiments, W is aryl substituted with one or more electron-withdrawing groups. In some embodiments, the first monomer comprises a negatively charged group. In some embodiments, the first monomer comprises a sulfonamide or a phosphoramide.

In some embodiments, W has the structure,

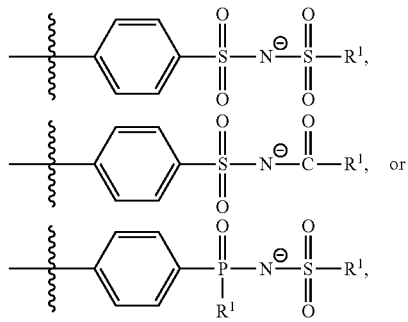

wherein $R^1$ is halide, optionally substituted alkyl, optionally substituted heteroalkyl, optionally substituted aryl, or optionally substituted heteroaryl.

In some embodiments, $R^1$ is halide or optionally substituted alkyl. In some embodiments, $R^1$ is fluorine. In some embodiments, $R^1$ is alkyl substituted with one or more electron-withdrawing groups. In some embodiments, $R^1$ is $C_tZ_{(2t+1)}$, wherein each Z is independently hydrogen or halide, and t is an integer from 1 to 20. In some embodiments, each Z is halide. In some embodiments, each Z is fluorine.

In one set of embodiments, W has the following structure,

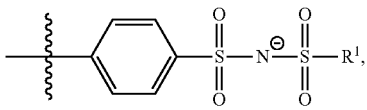

wherein R¹ is defined as above.

In one set of embodiments, the first monomer is

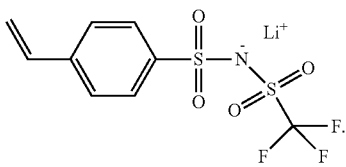 [SMILES: C=Cc1ccc(S(=O)(=O)NS(=O)(=O)C(F)(F)F)cc1 ; [Li+]]

In some embodiments, the second monomer has the following structure,

wherein X is a group comprising a hydrophilic group. In some embodiments, X is aryl substituted with a hydrophilic group. In some embodiments, X is aryl substituted with an optionally substituted heteroalkyl, an optionally substituted heterocycloalkyl, or an optionally substituted aryl-heteroalkyl.

In some embodiments, X is aryl substituted with one or more ether groups. In some embodiments, the ether group is a poly(alkylene oxide), a cyclic ether, an arylether, or a polymer or copolymer thereof. In some embodiments, the ether group is a poly(propylene oxide) chain, a poly(ethylene oxide) chain, or a crown ether.

In one set of embodiments, the ether group has the formula,

—O[(CH$_2$)$_e$O]$_f$—R$^2$, wherein e is an integer from 1-6, f is an integer from 1 to 100, and R² is H, optionally substituted alkyl, or optionally substituted aryl.

In another set of embodiments, X is aryl substituted with a group having the formula, —NR$^2${[(C(R$^2$)$_2$)$_e$NR$^2$]$_f$—R$^2$, wherein e is an integer from 1-6, f is an integer from 1 to 100, and each R² is independently H, optionally substituted alkyl, or optionally substituted aryl.

In some embodiments, X has the structure,

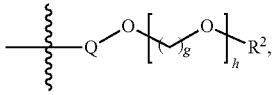

wherein Q is optionally substituted alkylene, optionally substituted heteroalkylene, optionally substituted arylene, or optionally substituted heteroalkylene; R² is H, optionally substituted alkyl, or optionally substituted aryl; g is 1, 2, 3, or 4, and h is an integer from 1 to 100.

In some embodiments, X has the structure,

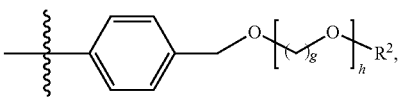

wherein R² is H, optionally substituted alkyl, or optionally substituted aryl; g is 1, 2, 3, or 4, and h is an integer from 1 to 100.

In some embodiments, X has the structure,

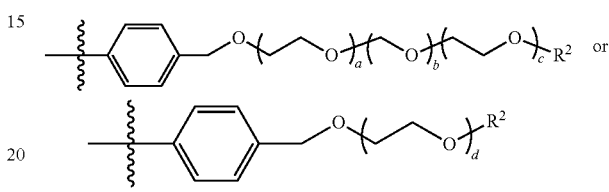

wherein R² is H, optionally substituted alkyl, or optionally substituted aryl; a, c, and d are each independently an integer between 1-100; and b is an integer between 1-50. In some embodiments, R² is H or optionally substituted alkyl. In one set of embodiments, the second monomer is

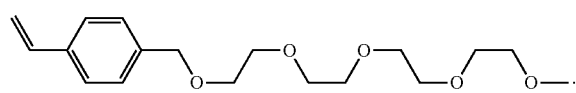

In some embodiments, the third monomer has the following structure,

wherein Y is a group comprising a crosslinking group. In some embodiments, Y comprises an optionally substituted aryl group, an optionally substituted heteroaryl group, an optionally substituted cycloalkyl group, or an optionally substituted heterocycloalkyl group.

In one set of embodiments, Y has the structure:

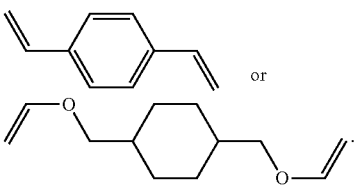

In any of the foregoing embodiments, the ratio of the first monomer to the second monomer is between 99:1 to 1:99. In some cases, the ratio of the first monomer to the second monomer is in the range of about 75:25 to about 25:75. In some cases, the ratio of the first monomer to the second monomer to the third monomer is in the range of about 98:1:1 to about 1:95:4.

In some cases, the article and/or electrochemical cells includes a polymer having the structure as in Formula I,

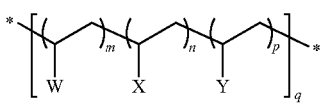 (I)

wherein:

W is a first type of side chain and is capable of associating with a metal cation;

X is a second type of side chain and comprises a hydrophilic group;

Y is a polymer chain, or Y is a crosslinking group attached to a polymeric chain;

each m and n is independently an integer from 1 to 100;

each p is independently 0, 1, 2, or 3; and q is an integer from 1 to 100,000, provided that at least one W and at least one X is present in the polymer.

In some embodiments, m is an integer from 2 to 4. In some embodiments, m is 1. In some embodiments, n is an integer from 2 to 4. In some embodiments, n is 1. In some embodiments, m and n are each independently an integer from 2 to 4. In some embodiments, m and n are each 1. In some embodiments, q is an integer from 50 to 50,000. In some embodiments, each p is 0.

In some embodiments, W in Formula I is:

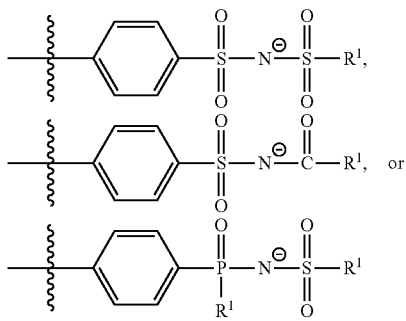

wherein each $R^1$ is independently halide, optionally substituted alkyl, optionally substituted heteroalkyl, optionally substituted aryl, or optionally substituted heteroaryl. In some embodiments, $R^1$ is alkyl, optionally substituted with one or more electron-withdrawing groups. In some embodiments, $R^1$ is $C_tZ_{(2t+1)}$, wherein each Z is a halogen (e.g., F), and t is an integer from 1 to 20. In some embodiments, t is an integer between 1 and 5, or an integer between 1 and 3, or is 1.

In some embodiments, in Formula I, X comprises a heteroalkyl, an ether chain, a polyalkylether chain, a cyclic ether group, or an arylether. In some embodiments, X comprises a crown ether. In some embodiments, X comprises the group, $-O[(CH_2)_eO]_f-R^2$, wherein e is an integer from 1 to 6, f is an integer from 1 to 100, and $R^2$ is H or optionally substituted alkyl or optionally substituted aryl. In some embodiments, X comprises the group, $-NR^2\{[(C(R^2)_2]_eNR^2\}_f-R^2$, wherein e is 1-6, f is 1-100, and each $R^2$ is independently H, optionally substituted alkyl, or optionally substituted aryl.

In some embodiments, in Formula I, e is an integer from 1 to 10, or from 1 to 3.

In some embodiments, in Formula I, f is an integer from 5 to 20.

In some embodiments, in Formula I, e is an integer from 1 to 10, or from 1 to 3, and f is an integer from 5 to 20.

In some embodiments, in Formula I, X comprises the structure:

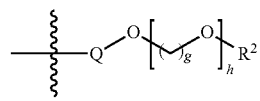

wherein Q is optionally substituted alkylene, optionally substituted heteroalkylene, optionally substituted arylene, or optionally substituted heteroalkylene; each $R^2$ is independently H, optionally substituted alkyl, or optionally substituted aryl; g is 1, 2, 3, or 4, and h is an integer from 1 to 100. In some embodiments, h is an integer from 5 to 25.

In some embodiments, in Formula I, X comprises an aryl group substituted with one or more ether groups. In some embodiments, in Formula I, X comprises the structure:

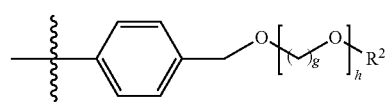

wherein $R^2$ is H, optionally substituted alkyl, or optionally substituted aryl; g is 1, 2, 3, or 4, and h is an integer from 1 to 100. In some embodiments, h is an integer from 5 to 25.

In some embodiments, in Formula I, X has the structure:

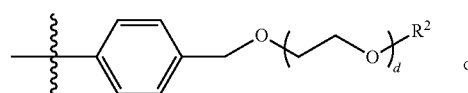 or

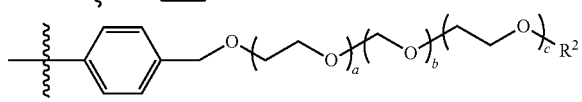

wherein:

each $R^2$ is independently H, optionally substituted alkyl, or optionally substituted aryl; each a, c, and d is independently an integer from 1 to 100; and b is an integer from 1 to 50. In some embodiments, a is an integer from 5 to 20. In some embodiments, b is an integer from 1 to 3. In some embodiments, c is an integer from 5 to 20. In some embodiments, d is an integer from 5 to 20. In some embodiments, a is an integer from 5 to 20, b is an integer from 1 to 3, and c is an integer from 5 to 20.

In some embodiments, $R^2$ is H.

In some embodiments, Y comprises an arylene group, a heteroarylene group, a cycloalkylene group, or a heterocycloalkylene group.

In some embodiments, Y has the structure:

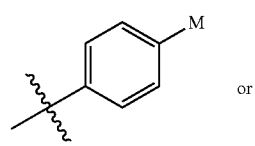 or

-continued

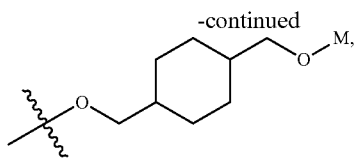

wherein M is a polymer chain, or M is a linking group attached to a polymeric chain.

In some embodiments, W, X, and/or Y may comprise a phenyl ring as described in the above structures wherein the phenyl ring is further substituted with additional groups. For example, one or more of the hydrogen groups in the structures described herein may be substituted with optionally substituted alkyl, optionally substituted aryl, optionally substituted heteroalkyl, or optionally substituted heteroaryl.

In some embodiments, the polymer comprises the structure as in Formula II:

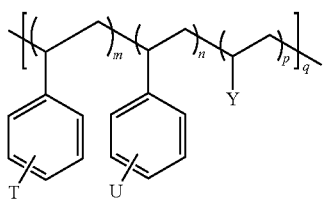

(II)

wherein:

T comprises an anionic species;

U comprises an ether chain or a poly(alkylene oxide);

Y is a polymer chain, or Y is a crosslinking group attached to a polymeric chain;

each m and n is independently an integer from 1 to 100;

each p is independently 0, 1, 2, or 3; and q is 1-100,000, wherein each phenyl ring is optionally substituted; and provided at least one T and one U is present in the polymer.

In some embodiments, m is an integer from 2 to 4. In some embodiments, m is 1. In some embodiments, n is an integer from 2 to 4. In some embodiments, n is 1. In some embodiments, m and n are each independently an integer from 2 to 4. In some embodiments, m and n are each 1. In some embodiments, q is an integer from 50 to 50,000. In some embodiments, each p is 0.

In one set of embodiments, the polymer has a structure as in Formula (III):

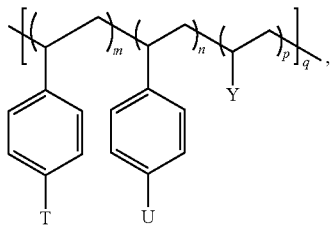

(III)

wherein T, U, Y, m, n, p, and q are defined as described herein with respect to Formula II.

In some embodiments, T comprises the structure:

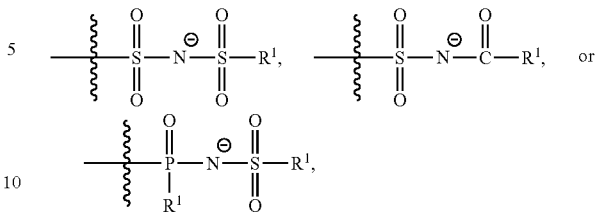

wherein each $R^1$ is independently halide, optionally substituted alkyl, optionally substituted aryl, or optionally substituted heteroaryl.

In some embodiments, $R^1$ is $C_t Z_{(2t+1)}$, wherein Z is a halogen or hydrogen, and t is an integer from 1 to 20. In some embodiments, t is an integer between 1 and 5, or an integer between 1 and 3, or is 1. In some embodiments, Z is a halogen (e.g., F).

In some embodiments, U comprises heteroalkyl, an ether chain, a poly(alkylene oxide) chain such as a poly(propylene oxide) chain or a poly(ethylene oxide) chain, a cyclic ether group, an arylether chain, or copolymers thereof.

In some embodiments, U comprises the group,

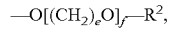
—O[(CH$_2$)$_e$O]$_f$—R$^2$, wherein e is an integer from 1 to 6, f is an integer from 1 to 100, and $R^2$ is H, optionally substituted alkyl, or optionally substituted aryl.

In some embodiments, U comprises the group,

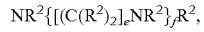
NR$^2$\{[(C(R$^2$)$_2$)$_e$NR$^2$\}$_f$R$^2$, wherein each e is an integer from 1 to 6, f is an integer from 1 to 100, and each $R^2$ is independently H, optionally substituted alkyl, or optionally substituted aryl. In some embodiments, e is an integer from 1 to 10, or an integer from 1 to 3. In some embodiments, f is an integer from 5 to 20.

In some embodiments, U comprises the structure:

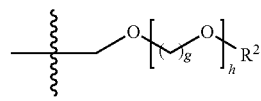

wherein $R^2$ is H, optionally substituted alkyl, or optionally substituted aryl; g is 1, 2, 3, or 4; and h is an integer from 1 to 100. In some embodiments, h is an integer from 5 to 25.

In some embodiments, U comprises the structure:

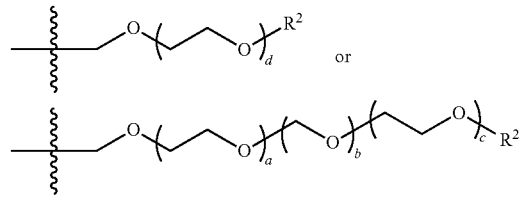

wherein:

$R^2$ is H, optionally substituted alkyl, or optionally substituted aryl;

each a, c, and d is independently an integer from 1 to 100; and b is an integer from 1 to 50.

In some embodiments, a is an integer from 5 to 20. In some embodiments, b is an integer from 1 to 3. In some embodiments, c is an integer from 5 to 20. In some embodiments, d is an integer from 5 to 20. In some embodiments, a is an integer from 5 to 20, b is an integer from 1 to 3, and c is an integer from 5 to 20.

In some embodiments, $R^2$ is H.

In some embodiments, the polymer may comprise a phenyl ring comprising T and being optionally substituted with one or more electron-withdrawing groups.

In some embodiments, each p is 0.

In any of the foregoing embodiments, the polymer is a random co-polymer or a block copolymer.

In any of the foregoing embodiments, the metal cation is an alkali metal ion. In some cases, the alkali metal cation is a lithium ion.

In any of the foregoing embodiments, the conductivity of the protective layer is greater than or equal to about $10^{-5}$ S/cm², greater than or equal to about $10^{-4}$ S/cm², or greater than or equal to about $10^{-3}$ S/cm². In any of the foregoing embodiments, the protective layer further comprises a homopolymer of a polyether or a polyether copolymer. In some cases, the ratio of the polymer to the homopolymer of a polyether or a polyether copolymer is between about 5% to 95% and about 95% to 5%. In any of the foregoing embodiments, the protective layer or polymer layer is adjacent to the electroactive layer. In any of the foregoing embodiments, the protective layer or polymer layer is directly adjacent the electroactive layer. In any of the foregoing embodiments, the protective layer or polymer layer has a thickness of less than 1 µm. In any of the foregoing embodiments, the protective layer or polymer layer is adjacent the anode. In any of the foregoing embodiments, the protective layer or polymer layer is directly adjacent the anode. In any of the foregoing embodiments, the protective layer or polymer layer is adjacent the cathode. In any of the foregoing embodiments, the protective layer or polymer layer is directly adjacent the cathode.

In any of the foregoing embodiments, the cathode includes sulfur as a cathode active species. In some cases, the cathode includes elemental sulfur as a cathode active species.

In any of the foregoing embodiments, the protective layer comprises at least one lithium salt. In some cases, the lithium salt is selected from the group consisting of $LiNO_3$, $LiPF_6$, $LiBF_4$, $LiClO_4$, $LiAsF_6$, $Li_2SiF_6$, $LiSbF_6$, $LiAlCl_4$, lithium bis-oxalatoborate, $LiCF_3SO_3$, $LiN(SO_2F)_2$, $LiC(C_jF_{2j+1}SO_2)_3$, wherein j is an integer in the range of from 1 to 20, and salts of the general formula $(C_jF_{2j+1}SO_2)_kXLi$ with j being an integer in the range of from 1 to 20, k being 1 when X is selected from oxygen or sulfur, k being 2 when X is selected from nitrogen or phosphorus, and k being 3 when X is selected from carbon or silicon.

In any of the foregoing embodiments, the ionic conductivity of the protective layer or polymer layer is at least about $1\times10^{-4}$ S/cm at room temperature in a dry state.

In any of the foregoing embodiments, the protective layer is a polymer gel layer that is stable to an applied pressure of at least 10 kg/cm² in a swollen state.

Use of a polymer or article according to any of the foregoing embodiments in an electrochemical cell, as an electrode, or as a protective structure, is also provided.

Use of electrochemical cells according to any of the foregoing embodiments for making or operating cars, computers, personal digital assistants, mobile telephones, watches, camcorders, digital cameras, thermometers, calculators, laptop BIOS, communication equipment or remote car locks is also provided.

Use of a polymer comprising polymerized units of a first monomer comprising a group capable of associating with a metal cation, a second monomer comprising a hydrophilic group, and, optionally, a third monomer comprising a cross-linking group, in an electrochemical cell, as an electrode, or as a protective structure, is also provided.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
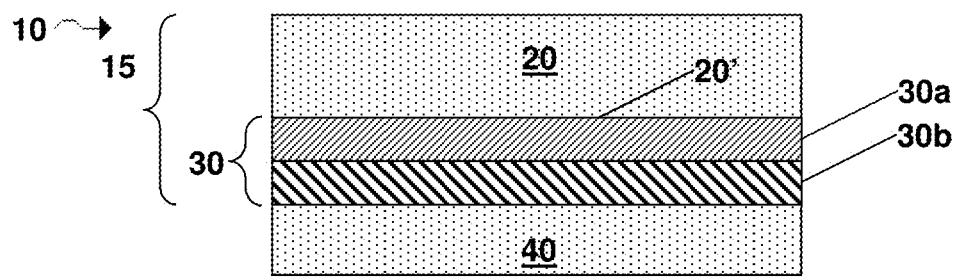
FIG. 1A shows an exemplary article including a protective structure for use in an electrochemical cell.

Polymers, and more specifically, polymers for use in electrochemical cells, are provided. The disclosed polymers may be incorporated into an alkali metal electrochemical cell (e.g., a lithium metal and/or a lithium ion electrochemical cell) as, for example, a protective layer and/or any other suitable component within the electrochemical cell.

The disclosed polymers may be incorporated into electrochemical cells such as primary batteries or secondary batteries, which can be charged and discharged numerous times. For example, the materials, systems, and methods described herein can be used in association with lithium-sulfur batteries. The electrochemical cells described herein may also be employed in various applications, for example, making or operating cars, computers, personal digital assistants, mobile telephones, watches, camcorders, digital cameras, thermometers, calculators, laptop BIOS, communication equipment or remote car locks.

The polymers disclosed herein may be employed in electrode structures (e.g., an anode or a cathode). Also, the polymers may find use in an article such as an electrode or electrochemical cell, as a protective layer, and/or in a protective structure (e.g., a multi-layered structure). The protective layer or protective structure may incorporate one or more of the herein disclosed polymers and may be used to separate an electroactive material from an electrolyte (or one or more reactive species within the electrolyte) to be used with the electrode or electrochemical cell. In one example, the electrode structure may include an electroactive layer and one or more polymer layers. The separation of an electroactive layer from the electrolyte of an electrochemical cell can be desirable for a variety of reasons, including (e.g., for lithium batteries) reducing or preventing dendrite formation during recharging, reducing or preventing reaction of lithium with the electrolyte or components in the electrolyte (e.g., solvents, salts and/or cathode discharge products), increasing cycle life, and improving safety (e.g., preventing thermal runaway). Reaction of an electroactive lithium layer with the electrolyte may result in the formation of resistive film barriers on the anode, which can increase the internal resistance of the battery and lower the amount of current capable of being supplied by the battery at the rated voltage. The polymers disclosed herein may also be employed as other components within an electrochemical cell; for example, the polymers may be optionally present as an electrolyte and/or as a separator.

A. Polymeric Compositions

Typically, an electrochemical cell comprises a polymer layer comprising a polymer described in more detail below. As noted herein, the polymer layer can be used as a protective layer in an electrochemical cell. Advantageously, the polymer may be designed to solvate metal cations and enhance salt dissociation, thereby promoting a relatively high conduction of metal cations through the polymer. The polymer may also be designed to impede negatively charged species through the polymer. As a result, a polymer layer including such a polymer in an electrochemical cell may serve as a protective layer while reducing or preventing concentration polarization.

Generally, the polymer comprises a polymer backbone (e.g., a polyvinyl backbone) and at least a first type and a second type of side chain, wherein the first type of side chain is capable of associating with (e.g., solvating) a metal cation and the second type of side chain comprises a hydrophilic group. The term "hydrophilic" as used herein is given its ordinary meaning in the art and refers to substances that have strongly polar groups that readily interact with water. A hydrophilic group is a group that is polar and that generally, readily interacts with water. The polymer may be a random copolymer or a block copolymer (e.g., random or block copolymer of the monomer comprising the first type of side chain and the monomer comprising the second type of side chain). The term "polymer" is given its ordinary meaning in the art and generally refers to extended molecular structures comprising polymer backbones and, optionally, pendant side groups. The term "polymer backbone" is also given its ordinary meaning in the art and refers to a linear chain of atoms within the polymer molecule by which other chains may be regarded as being side chains. The term "polyvinyl backbone" as used herein is given its ordinary meaning in the art and refers to a polymer backbone having the structure $-(CH_2CH_2)_q-$, wherein q is 1-100,000 and each H may be optionally substituted with another moiety (e.g., a side chain), for example, alkyl, heteroalkyl, aryl, heteroaryl, etc.

As described herein, in some embodiments the polymer includes a negative charge or other suitable species (e.g., on a side chain of the polymer) that can associate with (e.g., solvate, or otherwise stabilize) a metal cation. Association with the metal cation may take place, for example, through an ionic interaction. For instance, the polymer may include a nitrogen and/or phosphorous atom having a negative charge. In some embodiments, the polymer comprises a metal cation, such as a lithium-containing group (e.g., $Li^+$), associated with the group or species of the polymer containing the negative charge. The polymer may also include other species described herein, such as a side chain including a hydrophilic group.

In one example, the polymer may comprise a structure as in Formula I:

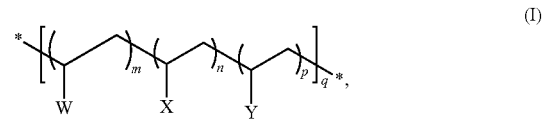

wherein W is a first type of side chain and is capable of associating with (e.g., solvating) a metal cation, X is a second type of side chain and comprises a hydrophilic group, Y is polymer chain, or a crosslinking group associated with (e.g., attached to) another polymeric chain, each m and n is independently 1-100; each p is independently 0, 1, 2, or 3; and q is 1-100,000, provided that at least one W and at least one X is present in the polymer. For example, m can be 1 or 2-4; n can be 1 or 2-4; or, m and n can be 1; or m and n can independently be 2-4. In Formula I, q can be between 50-50,000. It is also possible that the polymer does not comprise a crosslinking group (e.g., each p is 0).

As described herein, the polymer comprises a first type of side chain (e.g., W in Formula I) which is capable of associating with (e.g., solvating), or can otherwise stabilize, a metal cation. For example, the first type of side chain may associate with a metal cation through an ionic interaction. In certain embodiments, the polymer (and/or a monomer used to form the polymer) may include a nitrogen and/or phosphorous atom having a negative charge, e.g. as part of the first type of side chain. Metal cations are described herein and may include, for example, an alkali metal cation such as a lithium cation, a sodium cation, or a potassium cation. The side chain may be capable of associating with a metal cation, e.g., in embodiments in which the side chain comprises a negative charge. The charge on the side chain can be (−1) or greater than (−1) (e.g., (−2) or (−3)). The negative charge may promote stabilization of a metal cation and repulsion of negatively charged species, such as negatively charged species within an electrolyte (e.g., polysulfide anions generated from a sulfur-based cathode). The negative charge may also promote salt dissociation, resulting in enhanced metal cation conductivity through the polymer.

The first type of side chain may comprise a carbonamide, a sulfonamide, a phosphoramide, a nitramide (e.g., —N—$NO_2$), or derivatives thereof. For example, the first type of side chain may comprise a carbonamide, a sulfonamide, or a phosphoramide. The carbonamide, the sulfonamide, the phosphoramide, or the nitramide may include a negative charge as described herein.

The first type of side chain can comprise the structure (e.g., W in Formula I):

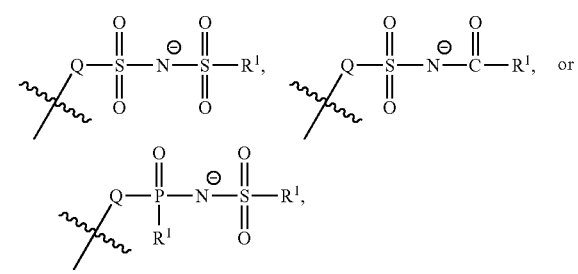

wherein each Q is optionally substituted alkylene, optionally substituted heteroalkylene, optionally substituted arylene, or optionally substituted heteroalkylene and each $R^1$ is independently halide, optionally substituted alkyl, optionally substituted heteroalkyl, optionally substituted aryl, or optionally substituted heteroaryl. For example, the first type of side chain can comprise the structure (e.g., W in Formula I):

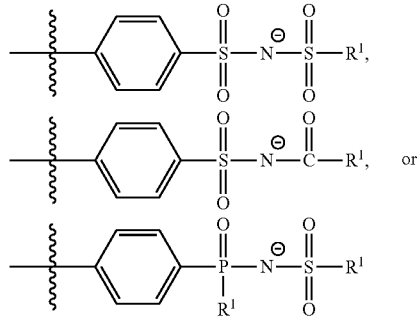

wherein each $R^1$ is independently halide, optionally substituted alkyl, optionally substituted heteroalkyl, optionally substituted aryl, or optionally substituted heteroaryl. The phenyl rings in the above structures may be further substituted. For example, one or more of the hydrogen groups on the structures above could be substituted with optionally substituted alkyl, optionally substituted aryl, optionally substituted heteroalkyl, or optionally substituted heteroaryl. For example, the phenyl ring may be further substituted with one or more electron-withdrawing groups, as described herein (e.g., 1, 2, 3, 4, or more, electron-withdrawing groups). $R^1$ in the above structures can be halide, such as F, or alkyl, such as alkyl substituted with one or more electron-withdrawing groups. The inclusion of one or more electron-withdrawing groups may result in a stronger negative charge on the nitrogen atom as compared to a substantially similar group which does not include an electron-withdrawing group, resulting in a stronger association of the metal cation with the anion. $R^1$ can be, for example, $C_tZ_{(2t+1)}$, wherein each Z is independently a halogen or hydrogen, and t is 1-20, such as t being between 1 and 5, or between 1 and 3, or 1. For example, each Z can be a halogen, such as fluorine.

The first type of side chain can also comprise the structure:

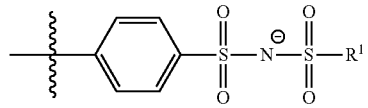

wherein each $R^1$ is independently halide, optionally substituted alkyl, optionally substituted heteroalkyl, optionally substituted aryl, or optionally substituted heteroaryl.

The term "electron-withdrawing group" is given its ordinary meaning in the art and refers to a functionality which draws electrons to itself more than a hydrogen atom would at the same position. Exemplary electron-withdrawing groups include halides, nitro, cyano, carbonyl groups (e.g., aldehydes, ketones, esters, etc.), sulfonyl, trifluoromethyl, and the like. For example, the electron withdrawing group can be selected from the group consisting of a haloalkyl, —CN, —COOR', —C(=O)R', —CON(R')$_2$, —CONR'H, halogen, —NO$_2$, —SO$_3$R', —SO(OR')$_2$, —SO(OR')H, —SOR', —SO$_2$R', —PO(OR')$_2$, —PO(OR')H, and protonated amine groups, wherein each occurrence of R' is independently selected from the group consisting of hydrogen; halogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; substituted or unsubstituted heteroaryl, substituted or unsubstituted, branched or unbranched alkylene oxide or poly(alkylene oxide); a metal ion, an anionic group, and a lithium-containing group.

The polymer generally comprises a second type of side chain which comprises a hydrophilic group (e.g., X in Formula I). The presence of the hydrophilic group may aid in the solvation of one or more components present in the electrochemical cell. For example, the presence of the hydrophilic groups may aid in the solvation of metal cations (e.g., lithium ions). The nature of the side groups can be selected to be similar to the nature of the liquid electrolyte.

The second type of side chain can comprise a heteroalkyl, an ether chain, a poly(alkylene oxide) chain such as a poly(propylene oxide) chain or a poly(ethylene oxide) chain, a cyclic ether group, or an arylether chain, or copolymers thereof. For example, the second type of side chain may comprise an ether chain or a crown ether. The second type of side chain can also comprise the structure, —O[(CH$_2$)$_e$O]$_f$—R$^2$, wherein each e is independently 1-6, f is 1-100, and R$^2$ is H or optionally substituted alkyl or optionally substituted aryl, such as e being between 1-6, or between 1-3, and f being between 5-20. The second type of side chain can also comprise the structure, —NR$^2$\{[(C(R$^2$)$_e$NR$^2$\}$_f$—R$^2$, wherein each e is independently 1-6, f is 1-100, and each R$^2$ is independently H or optionally substituted alkyl or optionally substituted aryl, such as e being between 1-6, or between 1-3, and f being between 5-20.

The second type of side chain can also comprise an aryl group substituted with one or more ether groups. For example, the second type of side chain can comprise the structure:

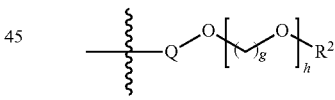

wherein Q is optionally substituted alkylene, optionally substituted heteroalkylene, optionally substituted arylene, or optionally substituted heteroalkylene; each $R^2$ is independently H, optionally substituted alkyl, or optionally substituted aryl; each g is independently 1, 2, 3, or 4; and h is 1-100, such as h being between 5-25. For example, the second type of side chain can comprise the structure:

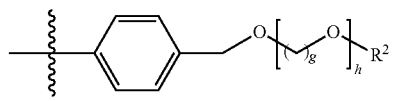

wherein each $R^2$ is independently H, optionally substituted alkyl, or optionally substituted aryl; each g is independently 1, 2, 3, or 4; and h is 1-100, such as h being between 5-25. The phenyl ring in the above structure may be further substituted. For example, one or more of the hydrogen groups on the structure above could be substituted with optionally substituted alkyl, optionally substituted aryl, optionally substituted heteroalkyl, or optionally substituted heteroaryl.

For example, the second type of side chain (e.g., X in Formula I) can comprise the structure:

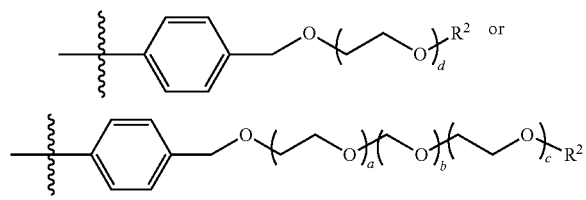

wherein each $R^2$ is independently H, optionally substituted alkyl, or optionally substituted aryl; each a, c, and d is independently 1-100; and b is 1-50, such as $R^2$ being H or alkyl; a being between 5-20; b being between 1-3; and c being between 5-20; and d being between 5-20. It should be appreciated that each of the second type of side chains described in the paragraphs above may be combined with any of the first type of side chains described herein.

The ratio of the first type of side chain (e.g., "W" in Formula I) to the second type of side chain (e.g., "X" in Formula I) may be between 99:1 to 1:99, for example between 25:75 to 75:25.

The polymer can further comprise a crosslinker. Addition of a crosslinker may be used to affect the properties of the resulting polymer, for example, mechanical properties such as rigidity and stickiness. The crosslinker can comprise an arylene or a heteroarylene group, or a cycloalkylene or a heterocycloalkylene group. For example, the crosslinker can comprise the structure:

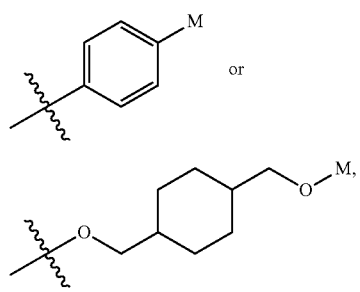

wherein M is a polymer chain, or M is a linking group attached to a polymeric chain. It should be appreciated that each of the crosslinkers described in the paragraphs above may be combined with any of the first type of side chains and/or any of the second type of side chains described herein.

When the polymer comprises a crosslinker, the ratio of the first type of side chain to the second type of side chain to the crosslinker may be varied to affect the resulting properties of the polymer. For example, the molar ratio of the first type of side chain to the second type of side chain to the crosslinker, e.g., W:X:Y in Formula I, can be between 98:1:1 to 1:95:4.

The polymer can also comprise a structure as in Formula (II):

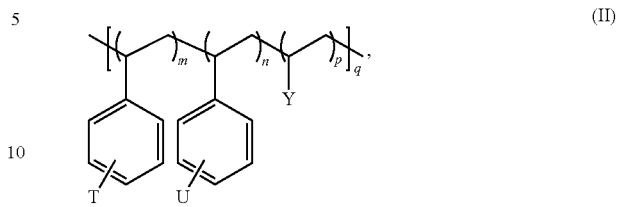

wherein T comprises an anionic species; U comprises an ether chain or a poly(alkylene oxide); Y is a polymer chain, or Y is a crosslinking group associated with another polymeric chain; each m and n is independently 1-100; each p is independently 0, 1, 2, or 3; and q is 1-100,000, wherein each phenyl ring is optionally substituted; provided that at least one T and one U is present in the polymer. For example, m can be between 5-25, such as m being 1, or m being 2-4; and n can be between 5-25, such as n being 1, or n being 2-4. For example, m and n can both be 1. Also, m and n can each independently be between 5-25; q can be between 50-50,000; and p can be 0.

The polymer may also comprise a structure as in Formula (III):

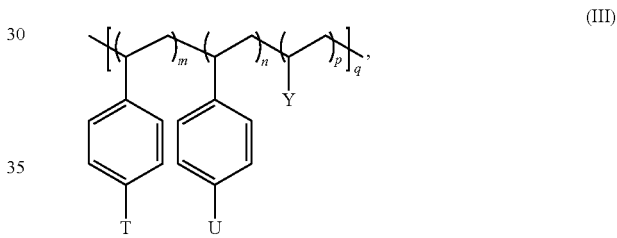

wherein T, U, Y, m, n, p, and q are as described with respect to Formula II.

T in Formula II or III can comprise the structure:

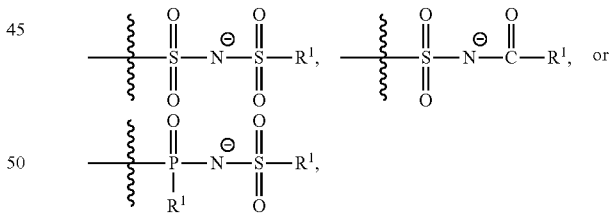

wherein each $R^1$ is independently halide, optionally substituted alkyl, optionally substituted aryl, or optionally substituted heteroaryl. For example, $R^1$ can be halide, such as F, or alkyl, such as alkyl substituted with one or more electron-withdrawing groups. As described herein, the inclusion of one or more electron-withdrawing groups may result in a stronger negative charge on the nitrogen atom as compare to a substantially similar group which does not include an electron-withdrawing group, resulting in a stronger association of the metal cation with the anion. For example, $R^1$ can be $C_tZ_{(2t+1)}$, wherein each Z is independently a halogen or hydrogen, and t is 1-20, such as t being between 1 and 5, or between 1 and 3, or 1, and each Z being a halogen, such as fluorine.

U in Formula II or III may comprise a heteroalkyl, an ether chain, a poly(alkylene oxide) chain such as a poly(propylene oxide) chain or a poly(ethylene oxide) chain, a cyclic ether group, or an arylether chain, or copolymers thereof. For example, U may comprise an ether chain or a crown ether. For example, U can comprise the structure —O[(CH$_2$)$_e$O]$_f$—R$^2$, wherein each e is independently 1-6, f is 1-100, and R$^2$ is H or optionally substituted alkyl or optionally substituted aryl, such as e being between 1-6, or between 1-3, and f being between 5-20.

U can also comprise the structure —NR$^2${[(C(R$^2$)$_2$]$_e$NR$^2$}$_f$—R$^2$, wherein each e is independently 1-6, f is 1-100, and each R$^2$ is independently H or optionally substituted alkyl or optionally substituted aryl. For example, U in Formula II or III can comprise the structure:

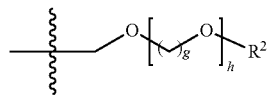

wherein each R$^2$ is independently H, optionally substituted alkyl, or optionally substituted aryl; each g is independently 1, 2, 3, or 4, and h is 1-100, such as h being between 5-25. U in Formula II or III can comprise the structure:

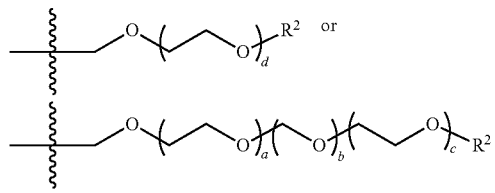

wherein each R$^2$ is independently H, optionally substituted alkyl, or optionally substituted aryl; each a, c, and d is independently 1-100; and b is 1-50, such as R$^2$ being H or alkyl; a being between 5-20; b being between 1-3; c being between 5-20; and d being between 5-20. It should be appreciated that each description of U in connection with Formula II or III in the paragraphs above may be combined with any T described above in connection with Formula II or III. In Formula II or III, p may be 0.

The polymer may be prepared by polymerization of, or may comprise polymerized units of, a first monomer comprising a group capable of associating with a metal cation, a second monomer comprising a hydrophilic group, and, optionally, a third monomer comprising a crosslinking group.

The first monomer may have the following structure,

wherein W is a group including a portion that is capable of associating with a metal cation. W can comprise an optionally substituted alkylene, an optionally substituted heteroalkylene, an optionally substituted arylene, or an optionally substituted heteroalkylene. For example, W can be aryl substituted with one or more electron-withdrawing groups.

The first monomer may comprise a negatively charged group, such as a sulfonamide or a phosphoramide.

For example, W may have the structure,

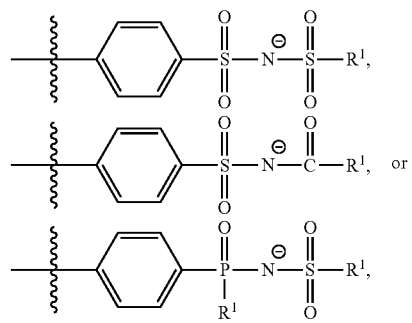

wherein R$^1$ is halide, optionally substituted alkyl, optionally substituted heteroalkyl, optionally substituted aryl, or optionally substituted heteroaryl. For example, R$^1$ may be halide, such as fluorine, or optionally substituted alkyl, such as alkyl substituted with one or more electron-withdrawing groups. R$^1$ can also be C$_t$Z$_{(2t+1)}$, wherein each Z is independently hydrogen or halide, for example, a halide such as fluorine, and t is an integer from 1 to 20.

For example, W may have the following structure,

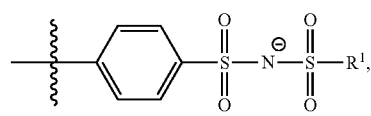

wherein R$^1$ is defined as above.

For example, the first monomer can be

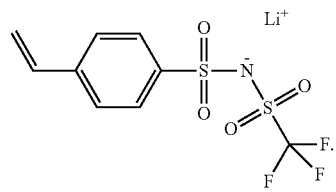 [SMILES: [Li+] ; C=Cc1ccc(S(=O)(=O)NS(=O)(=O)C(F)(F)F)cc1]

The second monomer may have the following structure,

wherein X is a group comprising a hydrophilic group, such as aryl substituted with a hydrophilic group. For example, X can be aryl substituted with an optionally substituted heteroalkyl, an optionally substituted heterocycloalkyl, or an optionally substituted aryl-heteroalkyl.

X can also be aryl substituted with one or more ether groups, such as a poly(alkylene oxide), a cyclic ether, an arylether, or a polymer or copolymer thereof. For example, the ether group can be a poly(propylene oxide) chain, a poly(ethylene oxide) chain, or a crown ether.

The ether group may have the formula,

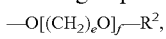

wherein e is an integer from 1-6, f is an integer from 1 to 100, and $R^2$ is H, optionally substituted alkyl, or optionally substituted aryl.

X may also be aryl substituted with a group having the formula,

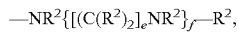

wherein e is an integer from 1-6, f is an integer from 1 to 100, and each $R^2$ is independently H, optionally substituted alkyl, or optionally substituted aryl.

For example, X may have the structure,

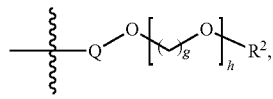

wherein Q is optionally substituted alkylene, optionally substituted heteroalkylene, optionally substituted arylene, or optionally substituted heteroalkylene; $R^2$ is H, optionally substituted alkyl, or optionally substituted aryl; g is 1, 2, 3, or 4, and h is an integer from 1 to 100.

For example, X may have the structure,

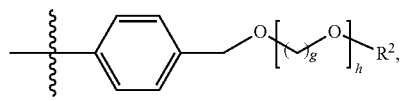

wherein $R^2$ is H, optionally substituted alkyl, or optionally substituted aryl; g is 1, 2, 3, or 4, and h is an integer from 1 to 100.

For example, X may have the structure,

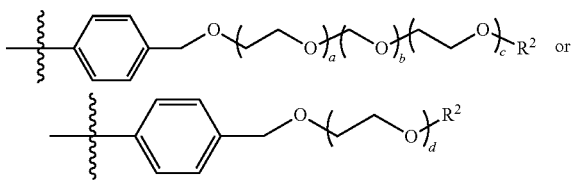

wherein $R^2$ is H, optionally substituted alkyl, or optionally substituted aryl; a, c, and d are each independently an integer between 1-100; and b is an integer between 1-50.

For example, the second monomer may be

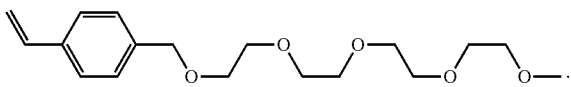

The third monomer may have the following structure,

wherein Y is a group comprising a crosslinking group. Y may comprise an optionally substituted aryl group, an optionally substituted heteroaryl group, an optionally substituted cycloalkyl group, or an optionally substituted heterocycloalkyl group. For example, Y may be substituted with a group capable of forming a bond with another polymer or monomer (e.g., a vinyl group). Y may also be substituted with a vinyl group such that the third monomer is a divinyl species. Y may be an aryl substituted with a vinyl group, or Y may also be cycloalkyl substituted with a vinyl group.

For example, Y may have the structure:

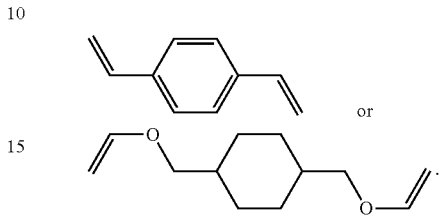

The ratio of the first monomer to the second monomer may be between 99:1 to 1:99, for example, in the range of about 75:25 to about 25:75. The ratio of the first monomer to the second monomer to the third monomer may be in the range of about 98:1:1 to about 1:95:4.

The polymer may be formed using methods known in the art, including methods using a photoinitiator. For example, a mixture of monomers may be combined with a solvent in the presence of a photoinitiator to form a pre-polymer solution. The polymerization may be carried out on a surface, for example, by first exposing the surface to the solution. The solution may be exposed to electromagnetic radiation (e.g., UV radiation), thereby causing the polymer to form.

The polymerization may be carried out on the surface of an electroactive material (e.g., a metal such as lithium or a metal alloy such as a lithium alloy). The formation of the polymer on the surface of an electroactive material may have many advantages. For example, the polymer may be capable of conducting lithium cations but not other undesirable cations/anions which are present, for example, polysulfide anions which may be present when the cathode comprises sulfur. As a result, the electroactive material may be protected from adverse reactions and/or the cycle life of the electrochemical cell may increase. The polymerization may also be carried out on the surface of a protective layer (e.g., a ceramic).

Any suitable solvent can be included in a pre-polymer solution, including aprotic solvents. Non-limiting examples of aprotic solvents including 1,3-dioxolane, 1,2-dimethoxyethane, 2-methoxyethyl ether, and tetrahydrofuran. For example, a solvent in a pre-polymer solution can be a solvent described herein for use an electrolyte in an electrochemical cell. The solvent may be an aliphatic or cycloaliphatic sulfone, or a N,N-dialkylamide. Other non-limiting examples of solvents include diglyme and N,N-dimethylacetamide.

Any suitable photoinitiator can be used to aid in polymerization of the polymer. Non-limiting examples of photoinitiators include methoxy benzion, benzophenone, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, and Irgacure 784®. The photoinitiator may be present in any suitable amount, for example, between about 0.5 and 5 wt %.

The reaction may be conducted in an inert atmosphere, for example, under vacuum or an atmosphere of inert gas (e.g., nitrogen, argon). For example, the reaction may be carried out at atmospheric pressure. The reaction may also be conducted at any suitable temperature. For example, the reaction can be carried out at a temperature between about 20 to 70° C. For example, the reaction may be carried out at a temperature of about room temperature. The reaction may also be carried out for any suitable period of time. For example, the reaction is carried out in a period of time required for the reaction to be substantially complete, and the time may be kept to the minimum time necessary for the reaction to be substantially complete. For example, the reaction time can be between 0.1 and 10 seconds.

It should be appreciated that other components can also be included in the pre-polymer solution and/or resulting polymer. For example, one or more alkali metal salts (e.g., lithium salts), such as those described herein, may be present in some instances.

Following formation of the polymer (e.g., on a surface), the polymer may be dried. For example, the polymer may be heated and/or placed under vacuum, thereby removing residual solvent. The polymer may be heated to a temperature between 50° C. and 200° C., or between 50° C. and 140° C., or between 50° C. and 100° C. For example, the polymer may be heated to a temperature of about 80° C. Other ranges of temperature are also possible.

The polymer layer for use in the electrochemical cells described herein may comprise a mixture of the polymers described above and/or may be combined with another polymeric material. For example, a polymer layer may comprise a polymer as described above in Section A and one or more additional polymers. The polymer layer may comprise a blend of a polymer described above in Section A and a homopolymer of a polyether or a polyether copolymer. Non-limiting examples homopolymers of a polyether or a polyether copolymer include PEO, PPO, and pTHF, or copolymers thereof (e.g., Alkox EP®-series). The ratio of the polymer from Section A and the one or more additional polymers (e.g., a homopolymer of a polyether or a polyether copolymer) may be between about 5:95 and about 95:5. For example, the ratio may be between 75:25 and 25:75.

The polymer (e.g., a protective polymer layer or a polymer gel layer) and/or an electrolyte may include one or more ionic electrolyte salts, also as known in the art, to increase the ionic conductivity. For example, the salt can be selected from salts of lithium or sodium. In particular, if the anode or cathode contains lithium, the salt can be selected from lithium salts.

Suitable lithium salts may be selected from, for example, $LiNO_3$, $LiPF_6$, $LiBF_4$, $LiClO_4$, $LiAsF_6$, $Li_2SiF_6$, $LiSbF_6$, $LiAlCl_4$, lithium bis-oxalatoborate (LiBOB), $LiCF_3SO_3$, $LiN(SO_2F)_2$, $LiC(C_jF_{2j+1}SO_2)_3$ wherein j is an integer in the range of from 1 to 20, and salts of the general formula $(C_jF_{2j+1}SO_2)_kXLi$ with j being an integer in the range of from 1 to 20, k being 1 when X is selected from oxygen or sulfur, k being 2 when X is selected from nitrogen or phosphorus, and k being 3 when X is selected from carbon or silicon. Suitable salts are selected from $LiC(CF_3SO_2)_3$, $LiN(CF_3SO_2)_2$, $LiN(SO_2F)_2$, $LiPF_6$, $LiBF_4$, $LiClO_4$, and $LiCF_3SO_3$. The concentration of salt in solvent can be in the range of from about 0.5 to about 2.0 M, from about 0.7 to about 1.5 M, or from about 0.8 to about 1.2 M (wherein M signifies molarity, or moles per liter). Other suitable lithium salts are described herein.

B. Electrochemical Cells

Having generally described the types of suitable polymer compositions, the incorporation of the polymers described in Section A into electrochemical cells will now be described. While many embodiments described herein describe lithium-based electrochemical cells, it is to be understood that any analogous alkali metal electrochemical cells (including alkali metal anodes) can be used.

As described above, the polymers may find use in an article such as an electrode (e.g., an anode or cathode) or electrochemical cell as a protective layer and/or protective structure (e.g., a multi-layered structure) that incorporates one or more of the herein disclosed polymers to separate an electroactive material from an electrolyte (or a species within an electrolyte) to be used with the electrode or electrochemical cell. For example, for lithium-sulfur electrochemical cells, a protective layer including a herein-disclosed polymer may impede polysulfide species (e.g., polysulfide anions) from contacting lithium.

A protective layer and/or protective structure that incorporates one or more of the polymers described herein can be substantially impermeable to the electrolyte (or a species within the electrolyte). For example, the protective layer and/or protective structure can be substantially unswollen in the presence of the electrolyte.

As described in more detail below, the protective layer and/or protective structure may be positioned directly on an electroactive material, or adjacent the electroactive material via one or more intervening layers.

The protective layer and/or protective structure may be substantially non-porous, although other configurations are also possible. For example, the protective layer and/or protective structure may have an average pore size of less than or equal to 10 microns, less than or equal to 5 microns, less than or equal to 2 microns, less than or equal to 1 micron, less than or equal to 0.5 microns, less than or equal to 0.1 microns, less than or equal to 50 nm, less than or equal to 20 nm, less than or equal to 10 nm, or less than or equal to 5 nm. In some embodiments, the average pore size may be at least 1 nm, at least 5 nm, at least 50 nm, at least 0.1 microns, or at least 0.5 microns. Combinations of the above-referenced ranges are also possible.

As described herein, one or more layers of the polymers described herein may be positioned between the active surface of an electroactive material and an electrolyte to be used in the electrochemical cell. As described in more detail below, one or more of the herein disclosed polymers may serve as a protective layer for an anode. Alternatively, one or more of the herein disclosed polymers may serve as a protective layer for a cathode. The polymer may, for example, compensate for the roughness of the cathode if a cathode surface is not smooth.

While a variety of techniques and components for protection of lithium and other alkali metal anodes are known, these protective layers present particular challenges, especially in rechargeable batteries. Since lithium batteries function by removal and re-plating of lithium from a lithium anode in each discharge/charge cycle, lithium ions must be able to pass through any protective layer. The protective layer must also be able to withstand morphological changes as material is removed and re-plated at the anode. The effectiveness of the protective layer in protecting an electroactive layer may also depend, at least in part, on how well the protective layer is integrated with the electroactive layer, the presence of any defects in the layer, and/or the smoothness of the layer(s). Many single thin film materials, when deposited on the surface of an electroactive lithium layer, do not have all of the necessary properties of passing Li ions, forcing a substantial amount of the Li surface to participate in current conduction, protecting the metallic Li anode against certain species (e.g., liquid electrolyte and/or polysulfides generated from a sulfur-based cathode) migrating from the cathode, and impeding high current density-induced surface damage.

Solutions to the problems described herein involve the use of an article including an anode comprising lithium, or any other appropriate electroactive material, and a protective layer comprising a herein-disclosed polymer positioned between an electroactive layer and an electrolyte of the cell. The protective layer may be a single layer of polymer in some instances.

The article may include a multi-layered structure comprising a herein-disclosed polymer positioned between an electroactive layer and an electrolyte of the cell. The multi-layered structure may serve as a protective layer or structure as described herein. The multi-layered structure may include, for example, at least a first ion conductive material layer (e.g., a ceramic layer, a glassy layer, a glassy-ceramic layer, or a secondary polymer layer) and at least a first polymeric layer formed from one or more of the polymers disclosed herein and positioned adjacent the ion conductive material. The multi-layered structure can optionally include several sets of alternating ion conductive material layers and polymeric layers. The multi-layered structure may include layers of different polymers such as those described herein.

The multi-layered structures can allow passage of lithium ions, while limiting passage of certain chemical species that may adversely affect the anode (e.g., species in the electrolyte). This arrangement can provide significant advantage, as polymers can be selected that impart flexibility to the system where it can be needed most, namely, at the surface of the electrode where morphological changes occur upon charge and discharge.

Ionic compounds (i.e., salts) may be included in the disclosed polymers. For example, lithium salts may be advantageously included in a polymer layer in relatively high amounts. Inclusion of the lithium and/or other salts may increase the ion conductivity of the polymer. Increases in the ion conductivity of the polymer may enable enhanced ion diffusion between associated anodes and cathodes within an electrochemical cell. Therefore, inclusion of the salts may enable increases in specific power available from an electrochemical cell and/or extend the useful life of an electrochemical cell due to the increased diffusion rate of the ion species there through.

Turning now to the figures, FIG. 1A shows a specific example of an article that can be used in an electrochemical cell. As shown in this example, article 10 includes an electrode 15 (e.g., an anode or a cathode) including an electroactive layer 20 that comprises an electroactive material (e.g., lithium metal). The electroactive layer may be covered by a protective structure 30, which can include, for example, an ion conductive layer 30a (e.g., a ceramic layer, a glassy layer, a glassy-ceramic layer, or a secondary polymer layer) disposed on an active surface 20' of the electroactive layer 20 and a polymer layer 30b formed from one or more of the polymers disclosed herein (e.g., as described in Section A). The protective structure may act as an effective barrier to protect the electroactive material from reaction with certain species in the electrolyte as described herein. Optionally, article 10 includes an electrolyte 40, which may be positioned adjacent the protective structure, e.g., on a side opposite the electroactive layer. The electrolyte can function as a medium for the storage and transport of ions. In some instances, electrolyte 40 may comprise a gel polymer electrolyte formed from the compositions disclosed herein.

A layer referred to as being "covered by," "on," or "adjacent" another layer means that it can be directly covered by, on, or adjacent the layer, or an intervening layer may also be present. For example, a polymer layer described herein (e.g., a polymer layer used as a protective layer) that is adjacent an anode or cathode may be directly adjacent the anode or cathode, or an intervening layer (e.g., another protective layer) may be positioned between the anode and the polymer layer. A layer that is "directly adjacent," "directly on," or "in contact with," another layer means that no intervening layer is present. It should also be understood that when a layer is referred to as being "covered by," "on," or "adjacent" another layer, it may be covered by, on or adjacent the entire layer or a part of the layer.

It should be appreciated that FIG. 1A is an exemplary illustration and that not all components shown in the figure need be present. Likewise, additional components not shown in the figure may be present in the articles described herein. For example, protective structure 30 may be a multilayer structure including 3, 4, 5, or more layers, as described in more detail below. In another example, although FIG. 1A shows an ion conductive layer 30a disposed directly on the surface of the electroactive layer polymer layer 30b may also be disposed directly on the surface of the electroactive layer. It is also possible that electrolyte 40 is not present in the article. Other configurations are also possible.

Figure 1B:
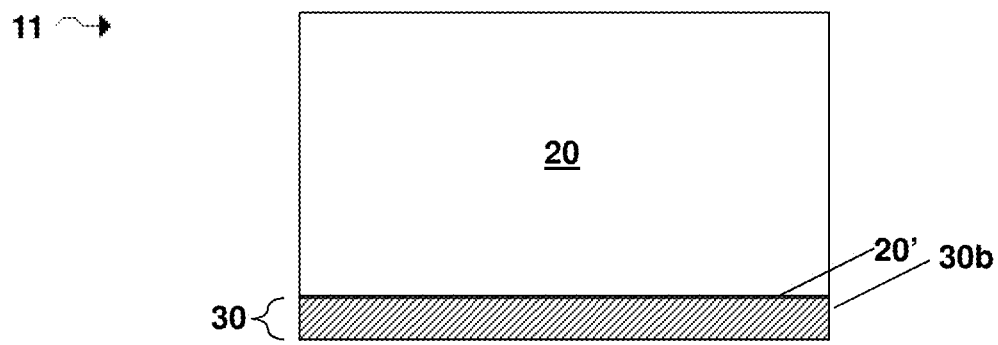
FIG. 1B shows an exemplary electrode including an electroactive layer and a polymer layer.

FIG. 1B shows an example where ion conductive layer 30a is not present and polymer layer 30b is positioned directly adjacent the electroactive layer. As depicted in FIG. 1B, article 11 (e.g., an electrode) includes electroactive layer 20 which is covered by protective structure 30 formed from a single polymer layer 30b. Polymer layer 30b may be formed from the polymers disclosed herein and may be disposed on active surface 20' of the electroactive layer. In addition to the structures depicted in FIGS. 1A and 1B, an article for use in an electrochemical cell may include a protective structure including one or more layers of the disclosed polymer and/or one or more layers of an ion conductive material, as shown illustratively in FIG. 1C. The protective structure may be positioned between the active surfaces of the anode and cathode. The protective structure may be positioned between an active surface of an electroactive material and the corresponding electrolyte of the cell. The one or more polymer layers and/or one or more ion conductive materials may form a multi-layered structure as described herein.

One advantage of a multi-layered structure includes the mechanical properties of the structure. The positioning of a polymer layer adjacent an ion conductive layer can decrease the tendency of the ion conductive layer to crack, and can increase the barrier properties of the structure. Thus, these laminates or composite structures may be more robust towards stress due to handling during the manufacturing process than structures without intervening polymer layers. In addition, a multi-layered structure can also have an increased tolerance of the volumetric changes that accompany the migration of lithium back and forth from the anode during the cycles of discharge and charge of the cell.

Figure 1C:
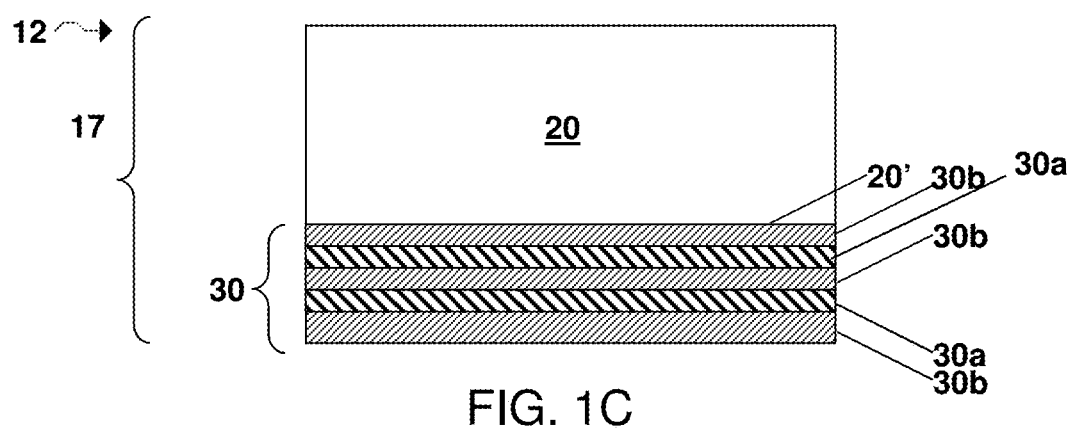
FIG. 1C shows an exemplary electrode including an electroactive layer and a multilayer protective structure.

In FIG. 1C, article 12 includes an electrode 17 (e.g., an anode or a cathode) comprising an electroactive layer 20. The electroactive layer comprises an electroactive material (e.g., lithium metal), and may optionally be covered by protective structure 30. As shown in FIG. 1C, protective structure 30 is disposed on the electroactive layer 20 and is a multi-layered structure including at least a first polymeric layer 30b formed from the polymers disclosed herein. The first polymeric layer is positioned adjacent the electroactive layer and a first ion conductive layer 30a is positioned adjacent the first polymer layer. In this example, the multi-layered structure can optionally include several sets of alternating ion conductive material layers 30a and polymeric layers 30b. The multi-layered structures can allow passage of, for example, lithium ions, while limiting passage of certain chemical species that may adversely affect the anode (e.g., species in the electrolyte). This arrangement can provide significant advantage, as the polymers can be selected to impart flexibility to the system where it can be needed most, namely, at the surface of the electrode where morphological changes occur upon charge and discharge. Although FIG. 1C shows a first polymeric layer 30b positioned directly adjacent the electroactive layer, an ion conductive layer 30a may be directly adjacent the electroactive layer. Other configurations are also possible.

Figure 2:
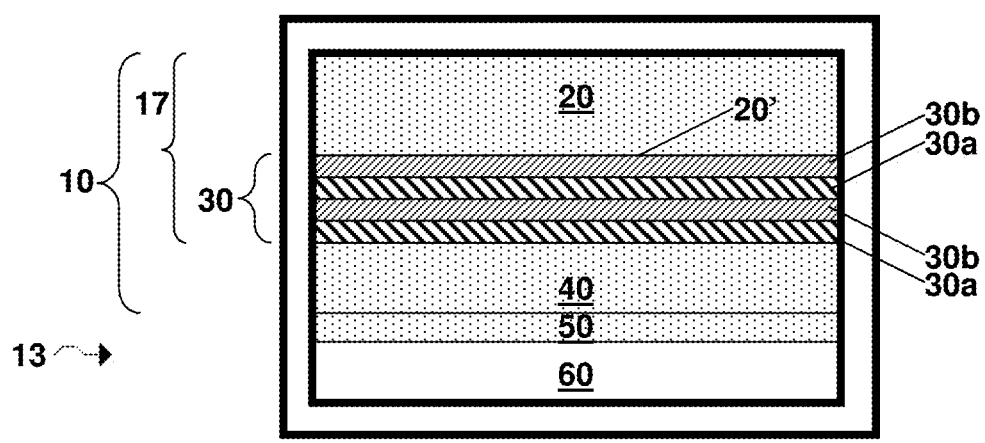
FIG. 2 shows an exemplary electrochemical cell.

A non-limiting example of an electrochemical cell is shown in FIG. 2. Article 10 comprising anode 17 of FIG. 1C (or article 15 of FIG. 1A or article 11 of FIG. 1B) may be incorporated with other components to form an electrochemical cell 13. The electrochemical cell includes a separator 50 positioned adjacent or within the electrolyte. Separator 50 may be formed from one or more of the polymers disclosed herein. The electrochemical cell may further include a cathode 60 comprising a cathode active material. As described above, protective structure 30 may be incorporated between electroactive layer 20 and electrolyte 40, and/or between electroactive layer 20 and cathode 60. In FIG. 2, protective structure 30 comprises a plurality of ion conductive layers 30a and polymer layers 30b. The ion conductive layers 30a and polymer layers 30b are arranged in an alternating pattern, although other arrangements are also possible. The polymer layers 30b may be formed from the polymers disclosed herein (e.g., as described in Section A). While four separate layers have been depicted, it should be appreciated that any suitable number of desired layers could be used (e.g., 5, 6, 7, 8 separate layers).

As described herein, an article may include a multi-layered structure. A multi-layered structure may have various overall thicknesses that can depend on, for example, the electrolyte, the cathode, or the particular use of the electrochemical cell. The multi-layered structure can have an overall thickness less than or equal to 1 mm, less than or equal to 700 microns, less than or equal to 300 microns, less than or equal to 250 microns, less than or equal to 200 microns, less than or equal to 150 microns, less than or equal to 100 microns, less than or equal to 75 microns, less than or equal to 50 microns, less than or equal to 20 microns, less than or equal to 10 microns, less than or equal to 5 microns, or less than or equal to 2 microns. The multi-layered structure may also have a thickness of greater than 100 nm, greater than 250 nm, greater than 500 nm, greater than 1 micron, greater than 2 microns, greater than 5 microns, greater than 10 microns, or greater than 20 microns. Other thicknesses are also possible. Combinations of the above-noted ranges are also possible.

When the polymer is employed as a protective layer, the thickness may be, for example, about 1 micron or less, for example, the thickness may be between about 10 nm and about 200 nm (e.g., between about 20 nm and about 100 nm, or between about 50 nm and about 100 nm). It should be understood that it may also be possible for the thickness of the polymer to be greater than 1 micron, e.g., between about 1 micron and about 50 microns (e.g., between about 1 micron and about 25 microns, or between about 25 microns and about 50 microns). Other thicknesses and ranges are possible and are described herein, such as those provided below.

In general, the polymer layer formed by a composition described herein may have any suitable thickness. The thickness may vary over a range from about 0.01 microns to about 20 microns. For instance, the thickness of the polymer layer may be between 0.05-0.15 microns thick, between 0.1-1 microns thick, between 1-5 microns thick, or between 5-10 microns thick. The thickness of a polymer layer may be, for example, less than or equal to 10 microns, less than or equal to 5 microns, less than or equal to 2.5 microns, less than or equal to 1 micron, less than or equal to 500 nm, less than or equal to 250 nm, less than or equal to 100 nm, less than or equal to 50 nm, less than or equal to 25 nm, or less than or equal to 10 nm. For example, the polymer layer may have a thickness of greater than 10 nm, greater than 25 nm, greater than 50 nm, greater than 100 nm, greater than 250 nm, greater than 500 nm, greater than 1 micron, or greater than 1.5 microns. For example, the polymer layer may have a thickness of 1 micron. Other thicknesses are also possible. Combinations of the above-noted ranges are also possible (e.g., a thickness of greater than 10 nm and less than or equal to 1 micron).

A polymer described herein can be configured, in some embodiments, to be substantially electronically non-conductive, which can inhibit the degree to which the polymer causes short circuiting of the electrochemical cell. In certain embodiments, a polymer described herein may have a bulk electronic resistivity of at least about $10^4$, at least about $10^5$, at least about $10^{10}$, at least about $10^{15}$, or at least about $10^{20}$ Ohm-meters and/or less than or equal to about $105^{50}$ Ohm-meters. A resulting layer including the polymer may also have a bulk electronic resistivity within one or more of these values.

The electrochemical cell generally comprises an electroactive layer. In some embodiments, the electroactive layer is a portion of the anode. Suitable electroactive materials for use as anode active materials in the electrochemical cells described herein include, but are not limited to, lithium metal such as lithium foil and lithium deposited onto a conductive substrate, and lithium alloys (e.g., lithium-aluminum alloys and lithium-tin alloys). Lithium can be contained as one film or as several films, optionally separated by a protective layer. In some embodiments, the anode may comprise one or more binder materials (e.g., polymers, etc.). In some embodiments, the electroactive layer (e.g., as a portion of the electrode) comprises lithium metal or a lithium metal alloy.

Suitable electroactive materials for use as cathode active materials in the cathode of the electrochemical cells described herein may include, but are not limited to, electroactive transition metal chalcogenides, electroactive conductive polymers, sulfur, carbon, and/or combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W (i.e., tungsten), Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

As described herein, cathodes suitable for lithium ion electrochemical cells are also possible.

As shown in FIG. 1A, in one set of embodiments, an article for use in an electrochemical cell may include an ion-conductive layer. In some embodiments, the ion conductive layer is a ceramic layer, a glassy layer, or a glassy-ceramic layer, e.g., an ion conducting ceramic/glass conductive to lithium ions. In other embodiments, the ion-conductive layer is a secondary polymer layer that is conductive to metal ions (e.g., lithium ions).

As described herein, an ion conductive layer may include, for example, a ceramic layer, a glassy layer, a glassy-ceramic layer, or a secondary polymer layer. Suitable ion conductive materials include, for example, silica, alumina, or lithium containing glassy materials such as lithium phosphates, lithium aluminates, lithium silicates, lithium phosphorous oxynitrides, lithium tantalum oxide, lithium aluminosulfides, lithium titanium oxides, lithium silcosulfides, lithium germanosulfides, lithium aluminosulfides, lithium borosulfides, and lithium phosphosulfides, and combinations of two or more of the preceding. Suitable lithium alloys for use in the embodiments described herein can include alloys of lithium and aluminum, magnesium, silicon, indium, and/or tin. While these materials may be preferred in some embodiments, other cell chemistries are also contemplated.

Suitable glasses and/or ceramics include, but are not limited to, those that may be characterized as containing a "modifier" portion and a "network" portion, as known in the art. The modifier may include a metal oxide of the metal ion conductive in the glass or ceramic. The network portion may include a metal chalcogenide such as, for example, a metal oxide or sulfide. For lithium metal and other lithium-containing electrodes, an ion conductive layer may be lithiated or contain lithium to allow passage of lithium ions across it. Ion conductive layers may include layers comprising a material such as lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. The selection of the ion conducting material will be dependent on a number of factors including, but not limited to, the properties of electrolyte and cathode used in the cell.

In certain embodiments in which an ion conductive layer is a secondary polymer, the secondary polymer may include, for example, polymers that are highly conductive towards metal ions (e.g., lithium ions) and minimally conductive towards electrons. Examples of such secondary polymers include ionically conductive polymers, sulfonated polymers, and hydrocarbon polymers. The selection of the polymer will be dependent upon a number of factors including the properties of electrolyte and cathode used in the cell. Suitable ionically conductive polymers may include, e.g., ionically conductive polymers known to be useful in solid polymer electrolytes and gel polymer electrolytes for lithium electrochemical cells, such as, for example, polyethylene oxides. Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylene-propylene polymers, polystyrene polymers, and the like.

Secondary polymers can also include crosslinked polymer materials, e.g., formed from the polymerization of monomers such as alkyl acrylates, glycol acrylates, polyglycol acrylates, polyglycol vinyl ethers, and polyglycol divinyl ethers, and polydivinyl poly(ethylene glycol). The crosslinked polymer materials may further comprise salts, for example, lithium salts, to enhance ionic conductivity.

In one set of embodiments, the ion conductive layer is a non-electroactive metal layer. The non-electroactive metal layer may comprise a metal alloy layer, e.g., a lithiated metal layer especially in the case where a lithium anode is employed. The lithium content of the metal alloy layer may vary from about 0.5% by weight to about 20% by weight, depending, for example, on the specific choice of metal, the desired lithium ion conductivity, and the desired flexibility of the metal alloy layer. Suitable metals for use in the ion conductive material include, but are not limited to, Al, Zn, Mg, Ag, Pb, Cd, Bi, Ga, In, Ge, Sb, As, and Sn. Sometimes, a combination of metals, such as the ones listed above, may be used in an ion conductive material.

In some embodiments, the ion conductive material is non-polymeric. In certain embodiments, the ion conductive material is defined in part or in whole by a layer that is highly conductive toward lithium ions (or other ions) and minimally conductive toward electrons. In other words, the ion conductive material may be one selected to allow certain ions, such as lithium ions, to pass across the layer, but to impede electrons, from passing across the layer. In some embodiments, the ion conductive material forms a layer that allows only a single ionic species to pass across the layer (i.e., the layer may be a single-ion conductive layer). In other embodiments, the ion conductive material may be substantially conductive to electrons.

The ion conductive layer may be formed or deposited by any suitable method such as using plasma conversion based techniques (e.g., plasma enhanced chemical vacuum deposition (PECVD)), electron beam evaporation, magnetron sputtering, chemical vapor deposition (e.g., laser enhanced chemical vapor deposition), thermal evaporation, jet vapor deposition, laser ablation and any other appropriate formation technique, deposition technique, and/or any appropriate combination thereof. The technique used may depend on the type of material being deposited, the thickness of the layer, etc. Alternatively, the layer of electroactive material may be exposed to a gas, such as nitrogen, under suitable conditions to react with the electroactive material at the surface of the electroactive material layer to form the ion conductive layer.

The thickness of an ion conductive material layer may vary over a range from about 1 nm to about 10 microns. For instance, the thickness of the ion conductive material layer may be between 1-10 nm thick, between 10-100 nm thick, between 100-1000 nm thick, between 1-5 microns thick, or between 5-10 microns thick. In some embodiments, the thickness of an ion conductive material layer may be, for example, less than or equal to 10 microns, less than or equal to 5 microns, less than or equal to 1000 nm, less than or equal to 500 nm, less than or equal to 250 nm, less than or equal to 100 nm, less than or equal to 50 nm, less than or equal to 25 nm, or less than or equal to 10 nm. In certain embodiments, the ion conductive layer may have a thickness of greater than or equal to 10 nm, greater than or equal to 25 nm, greater than or equal to 50 nm, greater than or equal to 100 nm, greater than or equal to 250 nm, greater than or equal to 500 nm, greater than or equal to 1000 nm, or greater than or equal to 1500 nm. Combinations of the above-referenced ranges are also possible (e.g., a thickness of greater than or equal to 10 nm and less than or equal to 500 nm). Other thicknesses are also possible. In some cases, the ion conductive layer has the same thickness as a polymer layer in a multi-layered structure.

In some embodiments, an ion conductive layer described herein may have an average ionic conductivity (e.g., lithium ion conductivity) of at least about $10^{-7}$ S/cm, at least about $10^{-6}$ S/cm, at least about $10^{-5}$ S/cm, at least about $10^{4}$ S/cm, at least about $10^{-3}$ S/cm, at least about $10^{-2}$ S/cm, at least about $10^{-1}$ S/cm, at least about 1 S/cm, or at least about 10 S/cm. The average ionic conductivity may less than or equal to about 20 S/cm, less than or equal to about 10 S/cm, or less than or equal to 1 S/cm. Conductivity may be measured at room temperature (e.g., 25 degrees Celsius).

In some embodiments, the conductivity of a polymer described herein is determined in the dry state. The dry state ion conductivity of the polymer (or polymer layer(s)) may vary over a range from, for example, about $10^{-7}$ S/cm to about 1 S/cm. In some embodiments, the dry state ion conductivity is between about 0.1 mS/cm and about 1 mS/cm, or between about 0.1 mS/cm and about 0.9 mS/cm, or between about 0.15 mS/cm and about 0.85 mS/cm. In certain embodiments, the dry state ion conductivity may be greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, or greater than or equal to $10^{-2}$ S/cm. In some embodiments, the dry state ion conductivity may be, for example, less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, or less than or equal to $10^{-5}$ S/cm. Combinations of the above-referenced ranges are also possible (e.g., a dry state ion conductivity of greater than or equal to greater than or equal to $10^{-5}$ S/cm and less than or equal to $10^{-3}$ S/cm). Other dry state ion conductivities are also possible.

In some embodiments, conductivity may be measured (e.g., in a dry state) in a "capacitor" type cell wherein a layer comprising a polymer (e.g., as described herein) is sandwiched between two electrodes. The electrodes may be inert (e.g., comprising Ni, Pt, Cu, or carbon) or active (e.g., Li, Li-alloy). Full spectra electrochemical impedance may be measured in a range of frequencies (e.g., from 0.1 Hz up to 1 MHz) with voltage amplitude of, for example, ~5-10 mV. The imaginary part of impedance can be plotted versus the real part for full frequencies range. For conductivity calculations the value R (Ohm) of intercept of the graph with real axis at high frequency is used in the formula: s=1/R*T/A, wherein s is the conductivity (S/cm), R is the value of high frequency intercept (Ohm), T is the polymer layer thickness (cm), and A is the polymer film area sandwiched between electrodes ($cm^2$).

In other embodiments, a polymer as described herein (e.g., from Section A) may be incorporated into a electrochemical cell as a separator. In some embodiments, an electrochemical cell may comprise an anode comprising an electroactive layer, a separator comprising a polymer as described herein (e.g., as a polymer layer), and a cathode. In some cases, such a separator may be suitable for use in an electrochemical cell including an electroactive material comprising lithium (e.g., metallic lithium). Generally, a separator is interposed between a cathode and an anode in an electrochemical cell. The separator may separate or insulate the anode and the cathode from each other to prevent short circuiting, while permitting the transport of ions between the anode and the cathode. The separator may be porous, wherein the pores may be partially or substantially filled with electrolyte. Separators may be supplied as free standing films which are interleaved with the anodes and the cathodes during the fabrication of cells. Alternatively, the separator layer may be applied directly to the surface of one of the electrodes. The separator may be located between the anode and the cathode of the electrochemical cell. In some cases, the separator is adjacent (e.g., directly adjacent) to the anode and/or the cathode of the electrochemical cell.

In embodiments wherein the polymer from Section A is to be employed as a separator, the thickness may be, for example, between about 1 micron and about 20 microns.

The separator may be porous and may have any suitable average pore size. For instance, in some embodiments, the separator may have an average pore size of, for example, less than or equal to 5 microns, less than or equal to 1 micron, less than or equal to 500 nm, less than or equal to 300 nm, less than or equal to 100 nm, or less than or equal to 50 nm. In some embodiments, the average pore size may be greater than 50 nm, greater than 100 nm, greater than 300 nm, greater than 500 nm, or greater than 1 micron. Other values are also possible. Combinations of the above-noted ranges are also possible (e.g., a pore size of less than 300 nm and greater than 100 nm).

The articles described herein may further comprise a substrate, as is known in the art. Substrates are useful as a support on which to deposit the anode active material, and may provide additional stability for handling of thin lithium film anodes during cell fabrication. Further, in the case of conductive substrates, a substrate may also function as a current collector useful in efficiently collecting the electrical current generated throughout the anode and in providing an efficient surface for attachment of electrical contacts leading to an external circuit. A wide range of substrates are known in the art of anodes. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. In other embodiments, described more fully below, the substrate may be selected from non-electrically-conductive materials.

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

In some embodiments, electrolyte 40, as shown illustratively in FIG. 2, may comprise a polymer gel (e.g., a polymer gel electrolyte) formed from the polymers disclosed herein. As known to those of ordinary skill in the art, when a solvent is added to a polymer and the polymer is swollen in the solvent to form a gel, the polymer gel is more easily deformed (and, thus, has a lower yield strength) than the polymer absent the solvent. The yield strength of a particular polymer gel may depend on a variety of factors such as the chemical composition of the polymer, the molecular weight of the polymer, the degree of crosslinking of the polymer if any, the thickness of the polymer gel layer, the chemical composition of the solvent used to swell the polymer, the amount of solvent in the polymer gel, any additives such as salts added to the polymer gel, the concentration of any such additives, and the presence of any cathode discharge products in the polymer gel.

In some embodiments, the polymer gel is formed by swelling at least a portion of the polymer in a solvent to form the gel. The polymers may be swollen in any appropriate solvent such as those described in for liquid electrolytes. In certain embodiments, the solvent may include, for example, dimethylacetamide (DMAc), N-methylpyrrolidone (NMP), dimethylsulfoxide (DMSO), dimethylformamide (DMF), sulfolanes, sulfones, and/or any other appropriate solvent. In certain embodiments, the polymer may be swollen in a solvent mixture comprising a solvent having affinity to polymer and also solvents having no affinity to the polymer (so-called non-solvents) such as, for PVOH, 1,2.dimethoxyethane (DME), diglyme, triglyme, 1,3-dioxolane (DOL), THF, 1,4-dioxane, cyclic and linear ethers, esters (carbonates such as dimethylcarbonate and ethylene carbonate), acetals and ketals.

In some embodiments, the polymers are swellable in 1,2-dimethoxyethane and/or 1,3-dioxolane solvents. The solvents for preparing the polymer gel may be selected from the solvents described herein and may comprise electrolyte salts, including lithium salts selected from the lithium salts described herein.

In some embodiments, an electrolyte layer described herein may have a thickness of at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible. In embodiments wherein the polymer from Section A is to be employed as a gel polymer layer, the thickness may be, for example, between about 1 micron and about 10 microns.

In embodiments where more than one solvent is employed in an electrolyte (e.g., a liquid electrolyte or a gel polymer electrolyte), the solvents may be present in any suitable ratio, for example, at a ratio of a first solvent to a second solvent of about 1:1, about 1.5:1, about 2:1, about 1:1.5, or about 1:2. In certain embodiments, the ratio of the first and second solvents may between 100:1 and 1:100, or between 50:1 and 1:50, or between 25:1 and 1:25, or between 10:1 and 1:10, or between 5:1 and 1:5. In some embodiments, the ratio of a first solvent to a second solvent is greater than or equal to about 0.2:1, greater than or equal to about 0.5:1, greater than or equal to about 0.8:1, greater than or equal to about 1:1, greater than or equal to about 1.2:1, greater than or equal to about 1.5:1, greater than or equal to about 1.8:1, greater than or equal to about 2:1, or greater than or equal to about 5:1. The ratio of a first solvent to a second solvent may be less than or equal to about 5:1, less than or equal to about 2:1, less than or equal to about 1.8:1, less than or equal to about 1.5:1, less than or equal to about 1.2:1, less than or equal to about 1:1, less than or equal to about 0.8:1, or less than or equal to about 0.5:1. Combinations of the above-referenced ranges are also possible (e.g., a ratio of greater than or equal to about 0.8:1 and less than or equal to about 1.5:1). In some embodiments, the first solvent is 1,2-dimethoxyethane and the second solvent is 1,3-dioxolane, although it should be appreciated that any of the solvents described herein can be used as first or second solvents. Additional solvents (e.g., a third solvent) may also be included.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes.

As described herein, it may be desirable to determine if a polymer has advantageous properties as compared to other materials for particular electrochemical systems. Therefore, simple screening tests can be employed to help select between candidate materials. One simple screening test includes positioning a layer of the resulting polymer of the desired chemistry in an electrochemical cell, e.g., as a gel electrolyte layer, a separator, or a protective layer in a cell. The electrochemical cell may then undergo multiple discharge/charge cycles, and the electrochemical cell may be observed for whether inhibitory or other destructive behavior occurs (e.g., deterioration of an electroactive material surface) compared to that in a control system. If inhibitory or other destructive behavior is observed during cycling of the cell, as compared to the control system, it may be indicative of decomposition, or other possible degradation mechanisms of the polymer, within the assembled electrochemical cell. Using the same electrochemical cell it is also possible to evaluate the electrical conductivity and ion conductivity of the polymer using methods known to one of ordinary skill in the art. The measured values may be compared to select between candidate materials and may be used for comparison with the baseline material in the control.

Another simple screening test to determine if a polymer has suitable mechanical strength may be accomplished using any suitable mechanical testing methods including, but not limited to, durometer testing, yield strength testing using a tensile testing machine, and other appropriate testing methods. In one set of embodiments, the polymer has a yield strength that is greater than or equal to the yield strength of the electroactive material (e.g., metallic lithium). For example, the yield strength of the polymer may be greater than approximately 2 times, 3 times, or 4 times the yield strength of electroactive material (e.g., metallic lithium). In some embodiments, the yield strength of the polymer is less than or equal to 10 times, 8 times, 6 times, 5 times, 4 times, or 3 times the yield strength of electroactive material (e.g., metallic lithium). Combinations of the above-referenced ranges are also possible. In one specific embodiment, the yield strength of the polymer is greater than approximately 10 kg/cm$^2$ (i.e., approximately 980 kPa). Other yield strengths greater than or less than the above limits are also possible. Other simple tests to characterize the polymers may also be conducted by those of ordinary skill in the art.

In some embodiments in which the herein-disclosed polymers are used as a polymer gel electrolyte layer, the polymer layer is stable to an applied pressure of at least 10 kg/cm$^2$, at least 20 kg/cm$^2$, or at least 30 kg/cm$^2$ in a swollen state. In some embodiments, the stability may be determined in the electrolyte solvent to be used with the electrochemical cell. In some embodiments, the electrolyte is 8 wt % lithium bis trifluoromethanesulfonimide and 4 wt % LiNO$_2$ in a 1:1 mixture by weight of 1,2-dimethoxyethane and 1,3-dioxolane. In some embodiments, the total salt concentration in the electrolyte may be between about 8 and about 24 wt %. Other concentrations are also possible.

The electrochemical cells described herein may find use in a variety of applications, for example, for making or operating cars, computers, personal digital assistants, mobile telephones, watches, camcorders, digital cameras, thermometers, calculators, laptop BIOS, communication equipment or remote car locks.

C. Definitions

For convenience, certain terms employed in the specification, examples, and appended claims are listed here.

Definitions of specific functional groups and chemical terms are described in more detail below. For purposes of this invention, the chemical elements are identified in accordance with the Periodic Table of the Elements, CAS version, *Handbook of Chemistry and Physics,* 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

The term "aliphatic," as used herein, includes both saturated and unsaturated, straight chain (i.e., unbranched), branched, acyclic, cyclic, or polycyclic aliphatic hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched, and cyclic alkyl groups. An analogous convention applies to other generic terms such as "alkenyl," "alkynyl," and the like. Furthermore, as used herein, the terms "alkyl," "alkenyl," "alkynyl," and the like encompass both substituted and unsubstituted groups. In certain embodiments, as used herein, "lower alkyl" is used to indicate those alkyl groups (cyclic, acyclic, substituted, unsubstituted, branched or unbranched) having 1-6 carbon atoms.

In certain embodiments, the alkyl, alkenyl, and alkynyl groups employed in the compounds described herein contain 1-20 aliphatic carbon atoms. For example, in some embodiments, an alkyl, alkenyl, or alkynyl group may have greater than or equal to 2 carbon atoms, greater than or equal to 4 carbon atoms, greater than or equal to 6 carbon atoms, greater than or equal to 8 carbon atoms, greater than or equal to 10 carbon atoms, greater than or equal to 12 carbon atoms, greater than or equal to 14 carbon atoms, greater than or equal to 16 carbon atoms, or greater than or equal to 18 carbon atoms. In some embodiments, an alkyl, alkenyl, or alkynyl group may have less than or equal to 20 carbon atoms, less than or equal to 18 carbon atoms, less than or equal to 16 carbon atoms, less than or equal to 14 carbon atoms, less than or equal to 12 carbon atoms, less than or equal to 10 carbon atoms, less than or equal to 8 carbon atoms, less than or equal to 6 carbon atoms, less than or equal to 4 carbon atoms, or less than or equal to 2 carbon atoms. Combinations of the above-noted ranges are also possible (e.g., greater than or equal to 2 carbon atoms and less than or equal to 6 carbon atoms). Other ranges are also possible.

Illustrative aliphatic groups include, but are not limited to, for example, methyl, ethyl, n-propyl, isopropyl, cyclopropyl, —CH$_2$-cyclopropyl, vinyl, allyl, n-butyl, sec-butyl, isobutyl, tert-butyl, cyclobutyl, —CH$_2$-cyclobutyl, n-pentyl, sec-pentyl, isopentyl, tert-pentyl, cyclopentyl, —CH$_2$-cyclopentyl, n-hexyl, sec-hexyl, cyclohexyl, —CH$_2$-cyclohexyl moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl, and the like.

The term "alkylene" as used herein refers to a bivalent alkyl group. An "alkylene" group is a polymethylene group, i.e., —(CH$_2$)$_z$—, wherein z is a positive integer, e.g., from 1 to 20, from 1 to 10, from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described herein for a substituted aliphatic group.

Generally, the suffix "-ene" is used to describe a bivalent group. Thus, any of the terms defined herein can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclylene", a bivalent heteroaryl ring is "heteroarylene", a bivalent alkyl chain is "alkylene", a bivalent alkenyl chain is "alkenylene", a bivalent alkynyl chain is "alkynylene", a bivalent heteroalkyl chain is "heteroalkylene", a bivalent heteroalkenyl chain is "heteroalkenylene", a bivalent heteroalkynyl chain is "heteroalkynylene", and so forth.

The term "alkoxy," or "thioalkyl" as used herein refers to an alkyl group, as previously defined, attached to the parent molecule through an oxygen atom or through a sulfur atom. In certain embodiments, the alkoxy or thioalkyl groups contain a range of carbon atoms, such as the ranges of carbon atoms described herein with respect to the alkyl, alkenyl, or alkynyl groups. Examples of alkoxy, include but are not limited to, methoxy, ethoxy, propoxy, isopropoxy, n-butoxy, tert-butoxy, neopentoxy, and n-hexoxy. Examples of thioalkyl include, but are not limited to, methylthio, ethylthio, propylthio, isopropylthio, n-butylthio, and the like.

Some examples of substituents of the above-described aliphatic (and other) moieties of compounds of the invention include, but are not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$ wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

In general, the terms "aryl" and "heteroaryl", as used herein, refer to stable mono- or polycyclic, heterocyclic, polycyclic, and polyheterocyclic unsaturated moieties having preferably 3-14 carbon atoms, each of which may be substituted or unsubstituted. Substituents include, but are not limited to, any of the previously mentioned substituents, i.e., the substituents recited for aliphatic moieties, or for other moieties as disclosed herein, resulting in the formation of a stable compound. In certain embodiments described herein, "aryl" refers to a mono- or bicyclic carbocyclic ring system having one or two aromatic rings including, but not limited to, phenyl, naphthyl, tetrahydronaphthyl, indanyl, indenyl, and the like. In certain embodiments, the term "heteroaryl", as used herein, refers to a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will be appreciated that aryl and heteroaryl groups can be unsubstituted or substituted, wherein substitution includes replacement of one, two, three, or more of the hydrogen atoms thereon independently with any one or more of the following moieties including, but not limited to: aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$ R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "cycloalkyl," as used herein, refers specifically to groups having three to seven, preferably three to ten carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or heterocyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "heteroaliphatic", as used herein, refers to aliphatic moieties that contain one or more oxygen, sulfur, nitrogen, phosphorus, or silicon atoms, e.g., in place of carbon atoms. Heteroaliphatic moieties may be branched, unbranched, cyclic or acyclic and include saturated and unsaturated heterocycles such as morpholino, pyrrolidinyl, etc. In certain embodiments, heteroaliphatic moieties are substituted by independent replacement of one or more of the hydrogen atoms thereon with one or more moieties including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The terms "halo" and "halogen" as used herein refer to an atom selected from fluorine, chlorine, bromine, and iodine.

The term "haloalkyl" denotes an alkyl group, as defined above, having one, two, or three halogen atoms attached thereto and is exemplified by such groups as chloromethyl, bromoethyl, trifluoromethyl, and the like.

The term "heterocycloalkyl" or "heterocycle", as used herein, refers to a non-aromatic 5-, 6-, or 7-membered ring or a polycyclic group, including, but not limited to a bi- or tri-cyclic group comprising fused six-membered rings having between one and three heteroatoms independently selected from oxygen, sulfur and nitrogen, wherein (i) each 5-membered ring has 0 to 1 double bonds and each 6-membered ring has 0 to 2 double bonds, (ii) the nitrogen and sulfur heteroatoms may be optionally be oxidized, (iii) the nitrogen heteroatom may optionally be quaternized, and (iv) any of the above heterocyclic rings may be fused to a benzene ring. Representative heterocycles include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl. In certain embodiments, a "substituted heterocycloalkyl or heterocycle" group is utilized and as used herein, refers to a heterocycloalkyl or heterocycle group, as defined above, substituted by the independent replacement of one, two or three of the hydrogen atoms thereon with but are not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples which are described herein.

The term "independently selected" is used herein to indicate that the R groups can be identical or different.

EXAMPLES

Non-limiting examples of the polymers described herein are illustrated by the following working examples.

Example 1

A solution containing 80% styrene substituted monomer, C$_{18}$H$_{28}$O$_5$ as an example, having the structure:

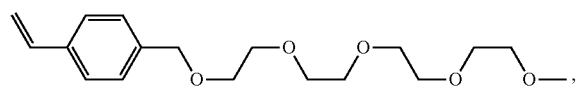

18% monomeric lithium salt having the structure:

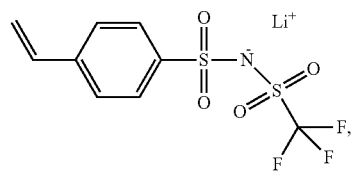 [SMILES: C=Cc1ccc(S(=O)(=O)NS(=O)(=O)C(F)(F)F)cc1 ; [Li+]]

and 2% cross-linking agent, divinylbenzene (DVB), having the structure:

with a photoinitiator (methoxy benzoin in an aprotic solvent (1,3-dioxolane) was coated on a polyethylene terephthalate (PET) substrate using a Meyer rod. A UV lamp (web speed=3 ft/min). was used to polymerize the co-polymer on substrate. An oven at 80° C. was used to dry the sample. The dry conductivity of resulting polymer film was measured to be ~1×10$^{-6}$ S/cm with an average polymer thickness of ~3 um. The thickness of the films were determined using a drop-gauge with a resolution ±0.2 microns.

Example 2

A solution containing 49% monomeric lithium salt (see Example 1 for the structure), 49% styrene monomer (C$_{18}$H$_{28}$O$_5$, see Example 1 for the structure), and 2% cross-linking agent (divinylbenzene) in aprotic solvent (DOL) with photo initiator was coated on PET using a Meyer rod. UV lamp was used to polymerize co-polymer on substrate as described in example 1. Samples were dried in hood for several days. Dry conductivity was measured to be ~1×10$^{-8}$ S/cm with an average polymer film thickness of ~4 um.

Example 3

A solution containing 47.5% monomeric lithium salt (see Example 1 for the structure), 47.5% styrene monomer (C$_{18}$H$_{28}$O$_5$, see Example 1 for the structure), and 5% cross-linking agent (DVB) in aprotic solvent (DOL) with photo initiator (2% wt) was coated on PET using a Meyer rod. A UV lamp was used to cure co-polymer on substrate. Samples were cured under UV without the need for further drying. The thickness of polymer film was 8-9 microns and the conductivity was ~$5\times10^{-6}$ S/cm.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of t and an he present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising: an anode comprising lithium a protective layer adjacent to the anode comprising a polymer; and a cathode, wherein the polymer comprises polymerized units of a first monomer comprising a group capable of associating with a metal cation and a second monomer, having the following structure,

wherein X is aryl substituted with a hydrophilic group.

2. An electrochemical cell as in claim 1, wherein the first monomer has the following structure,

wherein W is a group capable of associating with a metal cation.

3. An electrochemical cell as in claim 2, wherein W comprises an optionally substituted alkylene, an optionally substituted heteroalkylene, an optionally substituted arylene, or an optionally substituted heteroalkylene.

4. An electrochemical cell as in claim 3, wherein W is aryl substituted with one or more electron-withdrawing groups.

5. An electrochemical cell as in claim 2, wherein W has the structure,

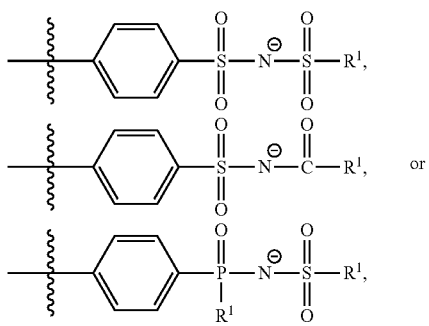

wherein each $R^1$ is independently halide, optionally substituted alkyl, optionally substituted heteroalkyl, optionally substituted aryl, or optionally substituted heteroaryl.

6. An electrochemical cell as in claim 5, wherein $R^1$ is halide or optionally substituted alkyl.

7. An electrochemical cell as in claim 6, wherein $R^1$ is fluorine.

8. An electrochemical cell as in claim 6, wherein $R^1$ is alkyl substituted with one or more electron-withdrawing groups.

9. An electrochemical cell as in claim 5, wherein $R^1$ is $C_t Z_{(2t+1)}$, wherein each Z is independently hydrogen or halide, and t is an integer from 1 to 20.

10. An electrochemical cell as in claim 9, wherein each Z is halide.

11. An electrochemical cell as in claim 9, each Z is fluorine.

12. An electrochemical cell as in claim 5, wherein W has the following structure,

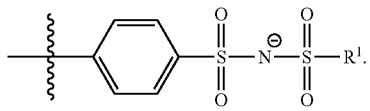

13. An electrochemical cell as in claim 5, wherein the first monomer is

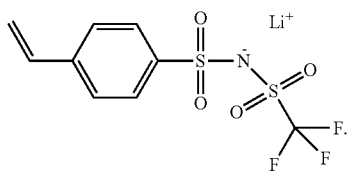 [SMILES: C=Cc1ccc(S(=O)(=O)NS(=O)(=O)C(F)(F)F)cc1 ; [Li+]]

14. An electrochemical cell as in claim 1, wherein X is aryl substituted with an optionally substituted heteroalkyl, an optionally substituted heterocycloalkyl, or an optionally substituted aryl-heteroalkyl.

15. An electrochemical cell as in claim 1, wherein X is aryl substituted with one or more ether groups.

16. An electrochemical cell as in claim 15, wherein the ether group is a poly(alkylene oxide), a cyclic ether, an arylether, or a polymer or copolymer thereof.

17. An electrochemical cell as in claim 15, wherein the ether group is a poly(propylene oxide) chain, a poly(ethylene oxide) chain, or a crown ether.

18. An electrochemical cell as in claim 15, wherein the ether group has the formula,

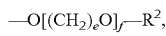

wherein e is an integer from 1-6, f is an integer from 1 to 100, and $R^2$ is H, optionally substituted alkyl, or optionally substituted aryl.

19. An electrochemical cell as in claim 1, wherein X is aryl substituted with a group having the formula,

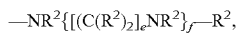

wherein e is an integer from 1-6, f is an integer from 1 to 100, and each $R^2$ is independently H, optionally substituted alkyl, or optionally substituted aryl.

20. An electrochemical cell as in claim 1, wherein X comprises the structure,

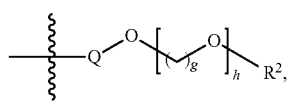

H wherein Q is optionally substituted alkylene, optionally substituted heteroalkylene, optionally substituted arylene, or optionally substituted heteroalkylene; $R^2$ is H, optionally substituted alkyl, or optionally substituted aryl; g is 1, 2, 3, or 4, and h is an integer from 1 to 100.

21. An electrochemical cell as in claim 1, wherein X has the structure,

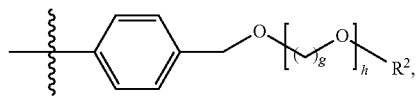

wherein $R^2$ is H, optionally substituted alkyl, or optionally substituted aryl; g is 1, 2, 3, or 4, and h is an integer from 1 to 100.

22. An electrochemical cell as in claim 1, wherein X has the structure,

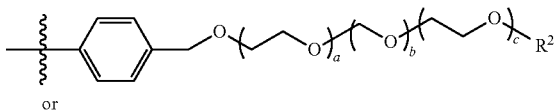

or wherein $R^2$ is H, optionally substituted alkyl, or optionally substituted aryl; a, c, and d are each independently an integer between 1-100; and b is an integer between 1-50.

23. An electrochemical cell as in claim 22, wherein $R^2$ is H or optionally substituted alkyl.

24. An electrochemical cell as in claim 1, wherein the second monomer is

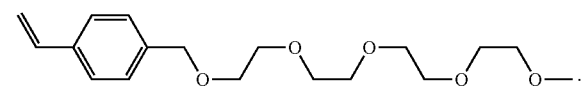

25. An electrochemical cell of claim 1, wherein the first monomer comprises a negatively charged group.

26. An electrochemical cell of claim 1, wherein the polymer comprises at least a first type of side chain and a second type of side chain, wherein the first type of side chain includes the group capable of associating with a metal cation, and wherein the second type of side chain includes the hydrophilic group.

27. An electrochemical cell as in claim 1, wherein the polymer comprises polymerized units of a third monomer comprising a crosslinking group.

28. An electrochemical cell as in claim 1, wherein the polymer comprises a side chain having a negatively charged group.

29. An electrochemical cell as in claim 1, wherein the first monomer is capable of solvating a metal cation.

* * * * *